(12) United States Patent
Wilson

(10) Patent No.: US 9,785,727 B1
(45) Date of Patent: Oct. 10, 2017

(54) METHOD AND SYSTEM OF ASSEMBLY DESIGN

(71) Applicant: Verso Furniture Inc., Shelburne (CA)

(72) Inventor: Jeffrey A. R. Wilson, Shelburne (CA)

(73) Assignee: Verso Furniture, Inc. (CA)

( * ) Notice: Subject to any disclaimer, the term of this patent is extended or adjusted under 35 U.S.C. 154(b) by 946 days.

(21) Appl. No.: 14/152,283

(22) Filed: Jan. 10, 2014

(51) Int. Cl.
*G06F 17/50* (2006.01)

(52) U.S. Cl.
CPC .......... *G06F 17/50* (2013.01); *G06F 17/5009* (2013.01)

(58) Field of Classification Search
USPC .............................. 703/1, 2; 706/45; 709/246
See application file for complete search history.

(56) References Cited

U.S. PATENT DOCUMENTS

| | | | |
|---|---|---|---|
| 5,293,479 | A | 3/1994 | Quintero et al. |
| 5,923,573 | A | 7/1999 | Hatanaka |
| 6,052,669 | A | 4/2000 | Smith et al. |
| 6,664,972 | B2 | 12/2003 | Eichel et al. |
| 6,727,925 | B1 | 4/2004 | Bourdelais |
| 6,981,747 | B2 | 1/2006 | Wieland et al. |
| 7,016,747 | B1 | 3/2006 | Ninomiya |
| 7,062,722 | B1 | 6/2006 | Carlin et al. |
| 7,149,665 | B2 | 12/2006 | Feld et al. |
| 7,246,044 | B2 | 7/2007 | Imamura et al. |
| 7,246,085 | B2 | 7/2007 | Kamon et al. |
| 7,249,005 | B2 | 7/2007 | Loberg |
| 7,277,572 | B2 | 10/2007 | MacInnes et al. |
| 7,330,856 | B2 | 2/2008 | Nicastro et al. |
| 7,505,044 | B2 | 3/2009 | Bowsher et al. |
| 7,523,411 | B2 | 4/2009 | Carlin |
| 7,542,925 | B2 | 6/2009 | Tung |
| 7,627,503 | B1 | 12/2009 | Champagne et al. |
| 7,657,341 | B2 | 2/2010 | Lind |
| 7,676,348 | B2 | 3/2010 | Okada |
| 7,884,818 | B2 | 2/2011 | Ninomiya |

(Continued)

FOREIGN PATENT DOCUMENTS

| | | |
|---|---|---|
| JP | 2004062628 A | 2/2004 |
| JP | 2007323242 A | 12/2007 |

OTHER PUBLICATIONS

Jali Ltd, Jali Home Design, website, captured Apr. 11, 2013, UK, www.jali.co.uk.

(Continued)

*Primary Examiner* — Thai Phan
(74) *Attorney, Agent, or Firm* — Clocktower Law; Erik J. Heels; Michael A. Bartley

(57) ABSTRACT

Disclosed is a system and method of creating configurators for positioning three dimensional objects or "Parts" of any size and shape relative to various elements of an infinitely expandable "Matrix" along X, Y, and Z axes. The location and size of such Parts can be controlled by designating Anchor Points on each Part, and associating these Anchor Points to Nodes on the Matrix, Axes defined by Nodes on the Matrix, Planes defined by axes of the Matrix, and Cells bounded by Planes of the Matrix. Parts may also be positioned by relating Anchor Points to those of other Parts. Associative positioning can be adjusted through the use of Offset Values which can be either fixed numeric values, or the result of equations which take into account a variety of influencing factors.

28 Claims, 37 Drawing Sheets

(56) References Cited

U.S. PATENT DOCUMENTS

| | | | |
|---|---|---|---|
| 8,065,623 B2 | 11/2011 | Bohlman | |
| 8,117,558 B2 | 2/2012 | Hoguet | |
| 8,134,556 B2 | 3/2012 | Elsberg et al. | |
| 8,212,805 B1 | 7/2012 | Banschick et al. | |
| 8,229,871 B2 * | 7/2012 | Woolf | G06F 17/50 706/45 |
| 8,314,793 B2 | 11/2012 | Beckman et al. | |
| 8,352,397 B2 | 1/2013 | Rubin et al. | |
| 9,315,663 B2 * | 4/2016 | Appleby | C08L 63/00 |
| 2001/0047250 A1 | 11/2001 | Schuller et al. | |
| 2002/0010655 A1 | 1/2002 | Kjallstrom | |
| 2002/0124109 A1 * | 9/2002 | Brown | G06F 17/24 709/246 |
| 2002/0128890 A1 * | 9/2002 | Dick | G06Q 10/06 705/7.26 |
| 2003/0172003 A1 | 9/2003 | Holbrook et al. | |
| 2004/0113945 A1 | 6/2004 | Park et al. | |
| 2005/0027553 A1 | 2/2005 | Samet | |
| 2008/0120129 A1 * | 5/2008 | Seubert | G06Q 10/06 705/35 |
| 2010/0169229 A1 | 7/2010 | Lee | |
| 2010/0268513 A1 | 10/2010 | Loberg | |
| 2010/0306681 A1 | 12/2010 | Loberg et al. | |
| 2011/0040542 A1 | 2/2011 | Sendhoff et al. | |
| 2011/0061011 A1 | 3/2011 | Hoguet | |
| 2011/0213480 A1 | 9/2011 | Zila et al. | |
| 2012/0268463 A1 | 10/2012 | Loberg | |
| 2013/0013268 A1 * | 1/2013 | Woolf | G06F 17/50 703/1 |
| 2013/0212513 A1 | 8/2013 | Loberg | |

OTHER PUBLICATIONS

Yoon, Oh, & Cho, Understanding Furniture Design Choices Using a 3D Virtual Showroom, Journal of Interior Design, May 2010, vol. 35 Issue 3, pp. 33-50, US.

Antlej, Rebersek, Cugelj, & Jelenc, Use of 3D Technologies in New Product Development, Proceedings of MIPRO 2010, May 24-28, 2010, pp. 268-273, Slovenia.

Saul, Lau, Mitani, & Igarashi, SketchChair: An All-in-one Chair Design System for End Users, Proceedings of the fifth international conference on Tangible, embedded, and embodied interaction, Jan. 22-26, 2011, pp. 73-80, Portugal.

Lou, Lan, Tzou, & Chen, The development of WEB based E-commerce platform for Rapid Prototyping system, Proceedings of the 2004 IEEE International Conference on Networking, Sensing & Control, Mar. 21-23, 2004, pp. 122-127, Taiwan.

Sheffield Furniture & Interiors, Icovia Room Planner, website, captured Apr. 11, 2013, US, sheffieldfurniture.icovia.com/icovia.aspx.

Ikea, Besta Storage Planner, website, captured Apr. 11, 2013, US, www.ikea.com/ms/en_US/rooms_ideas/planner_bestauppleva/.

* cited by examiner

Figure 15

BEFORE "PROPORTIONAL" SCALING

AFTER "PROPORTIONAL" SCALING

Before

BEFORE "SEQUENTIAL" SCALING

After

AFTER "SEQUENTIAL" SCALING

Figure 29

METHOD AND SYSTEM OF ASSEMBLY DESIGN

CROSS-REFERENCE TO RELATED APPLICATIONS

None.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2013, Verso Furniture Inc.

BACKGROUND

Field of Technology

This invention relates to a method and system of describing and controlling the shapes, sizes, and relative positions of interchangeable objects and object groups within a three dimensional assembly, and more specifically to the size and stylistics attributes of customizable case goods furniture.

Background

The advancement of computer technology as manifested in Computer Numerically Controlled (CNC) manufacturing machinery, increasingly sophisticated and intuitive Graphical User Interfaces (GUIs), and widespread internet access, has led to the growth of "mass customization"—the ability to specify and produce unique products with near-mass production efficiency. Many mass customization systems use a specialized category of user interface, called "Configurators," that display a range of customization options and capture users' requirements, thus making a traditionally inefficient and error prone process faster and more accurate. Configurators are commonly found in a wide range of product categories, including apparel, automobiles, footwear, furniture, and computer hardware.

Configurators perform much the same function as Computer Aided Design (CAD) systems (and might be considered a sub-category of CAD systems), in that they provide a set of tools for users to design their own creations and view visual representations of them. Key differences between Configurators and more conventional CAD systems are the level of flexibility the platform offers and the accompanying skill level demanded of the user: Configurators typically provide tools for a very narrow range of design options and require little or no skill to use, while CAD systems enable a broad range of design tools and capabilities but require training and expertise.

To maximize ease of use, existing Configurators restrict themselves to a narrow range of customization options, typically representing a small portion of the product variations available in the overall marketplace. This restriction is due to the simplistic nature of their architecture, which typically treats configurable options as independent entities with no ability to influence one another. Such systems fall short of the full capability that would be useful to users, as each one only presents a small fraction of the full spectrum of products a user might want, and thus they do not remove the need to "shop". That is, users must still locate and examine the offerings of multiple vendors, comparing attributes that are often presented arbitrarily and inconsistently, and can only be modified in minor ways.

Description of Prior Art

U.S. Pat. No. 5,293,479 "Design tool and method for preparing parametric assemblies" (QUINTERO, Mar. 8, 1994) discloses, in the Abstract, "An expert system is described for use in designing a connected collection of components which are available or can be made in different forms, e.g. which can be described by a selected number of variables. The expert system includes a knowledge base and an inference engine. The knowledge base includes records pertaining to constant and variable characteristics of connectable components and rules for combining a component with other components. The inference engine allows selecting a record for a first component, then a record for only those second components which can be connected to the first component, and storing information about the connections." This discloses a broad platform in the realm of Computer Aided Design (CAD) software. It describes the concept of organizing and inter-relating various classes of components, such as "primitives" and "subassemblies" according to pre-determined rules with constant and variable characteristics, and focuses on the assembly of components that are presumed to be static in nature (Col. 4, row 3).

U.S. Pat. No. 6,052,669 "Graphical user interface supporting method and system for remote order generation of furniture products" (SMITH, Apr. 18, 2000) discloses, in the Abstract, "A graphical user interface to a method and system for configuring office furniture includes interface objects for obtaining configuration criteria from a user; presenting the user with at least one typical configuration satisfying the criteria; selecting a typical configuration from the at least one typical configuration; modifying aspects of the selected typical configuration to produce a modified configuration; and checking the validity of the modified configuration. The configuration criteria include conferencing criteria; privacy criteria; power criteria; communications criteria; storage criteria; and area criteria. A typical can be modified by adding, deleting, or repositioning a component, changing the fabric or finish or the shape or size of the component. A cluster configuration based on the typical configuration is formed. The entire product line can be changed. At any time the entire typical or cluster configuration can be checked for validity and priced." This relates to the positioning of predefined objects within an interior space.

U.S. Pat. No. 7,016,747 "Article design support system and method and medium storing program for article design support" (Ninomiya, Mar. 21, 2006) discloses, in the Abstract, "A furniture design support system comprises a computer system. The computer system comprises an HD unit, which stores a furniture design support program and data representing the basic forms of units and parts. An operator defines a size, a finishing color, a material (the kind of wood), etc. with respect to the unit to be used for furniture to be designed on the basis of the desires of a customer, and also defines a finishing color, a material, etc. with respect to the part (a drawer, a door leaf, etc.) (step 33). Completed furniture is displayed on a display screen by assembling the unit and the part on the display screen. An HD stores design data related to the completed furniture (step 34). The appearance of the completed furniture is displayed on the display screen on the basis of the design data, and a design drawing is outputted from a printer (step 35)." Computerized data representations of "units" (i.e. top/bottom/side/back panels that comprise cabinet boxes) and "parts" (internal subassemblies) are made available to the user to specify positions and sizes of "parts" relative to the faces of the panels that comprise the "unit". Variable combinations of Parts may be positioned within a Unit, through the subdivision of the Unit. The method includes adjustment of the finish color and material of units and parts, the ability to add casters and legs of fixed dimensions and positions beneath a unit, the ability to create production schedules and instructions for specified cabinets and generate instruction documentation for assembly, shipping, etc., and various methods of joinery that may be used in Unit constructions. A user interface depends on i) selection of a pre-configured item of furniture, then ii) allows the user to modify it. The interface makes use of sequential processes for designating various features and attributes of the furniture. An implementation can be seen at wall2wall.furnituremaker.jp/index.html.

U.S. Pat. No. 7,246,044 "Method for aiding space design using network, system therefore, and server computer of the system" (Imamura, Jul. 17, 2007) discloses, in the Abstract, "Provided is an environment which enables a user to implement 3D space design on a computer accessible to a server computer via a network. The server computer includes a layout design program which is operable on a screen activated by a browser of the client computer to enable the user to implement space design of a layout in the terms of a 2D image, an object database which stores object data used for layout design for retrieval and extraction, and a 3D display program which is operable on the browser screen of the client computer to display the designed space in the terms of a 3D image. The client computer is equipped with the browser capable of executing programs of the layout design program and the 3D display program. Upon receiving the layout design program and the 3D display program from the server computer via the network, the programs of the layout design program and the 3D display program are executable on the browser screen." This relates to the positioning of predefined objects within an interior space.

U.S. Pat. No. 7,542,925 "Method and system of marketing and mass producing customized domestic furniture" (Tung, Jun. 2, 2009) discloses, in the Abstract "A system of marketing and mass producing customized domestic furniture includes a graphic customizing center and a service center. The graphic customizing center has an electronic database which contains a plurality of domestic floor plans and a plurality of furniture kits, wherein each of the domestic floor plans, which is simulated from a domestic environment to imitate the domestic furniture therein, has a plurality of customized areas preset on the domestic furniture to be customized for generating a plurality of custom made virtual domestic environments. The service center itemizes the furniture kits selected from the virtual domestic environments to mass-order the furniture kits for reducing a cost of the furniture kit in quantity manner." This relates to the positioning of predefined objects within an interior space.

U.S. Pat. No. 7,884,818 "Article design support system and method of controlling same" (Ninomiya, Feb. 8, 2011) discloses, in the Abstract "Provided is an article design support system featuring enhanced degree of freedom in terms of designing articles (for example, an article of furniture). A part space P surrounding a part incorporated in a cell space S is correlated with the cell space S, which is formed by a frame constituting a unit. The position (dimensions) of the part space P in the cell space S is defined by part space data specifying a relative position and relative dimensions using the cell space S as a reference. The position (dimensions) of a part in the part space P is defined by part (element) data specifying a relative position and relative dimensions using the part space P as a reference." This method defines a system of reference geometry wherein the outer boundary positions of the interior "Part" are driven by the positions of the panels comprising the "Unit", and supports changes to dimensions of "cells" as derived from changes to dimensions of "units".

United States Patent Application 2011/213,480 "Parametric product configuration system" (Zila, Sep. 1, 2011) discloses, in the Abstract, "A generic, integrated, parametric, automated product configuration system for parametric configuration of products such as offices on a building space plan. The system can produce bills of materials, costings and manufacturing drawings in real-time at the request of a user as the user specifies and configures the product components and parameters values. The system provides for real time three-dimensional visualization and editing of the product as it is configured. It also includes a rule engine for validating the product and automatically incorporating missing necessary components in a configuration in real-time as the user configures a product." This relates to a software platform and process flow for the configuration of elements in an interior design.

The website www.jali.co.uk (Jali Ltd., Canterbury, Kent, UK) deploys a method of customizing furniture, comprising of i) the selection of a predetermined product, such as a radiator cover, chest of drawers, or folding screen, ii) a graphical user interface (GUI) that presents the user with tools to adjust the size of the object and a selection of aesthetic treatments, such as carving patterns engraved into or through the surface of panels. The process presented by Jali has the ability to resize overall X/Y/Z dimensions of discrete products through its graphical user interface (GUI). It provides users with the ability to select and adopt various ornamental trim elements, such as base skirting and top trim.

The website www.sketchchair.cc deploys a system of designing chairs, comprising of i) the selection of a pre-existing design or the option to "create from scratch", and ii) a downloadable program that provides tools for adjusting the shape and position of components of the chair assembly. The SketchChair application uses interwoven "scissored" panels to design chairs.

The 20-20 Virtual Planner from 20-20 Technologies (Laval, Québec, Canada) is a computer application that provides a set of tools to enable i) the creation of an interior room setting (walls, windows, and doors), ii) the selection of objects to be placed within the created setting (furniture, toilets, appliances, etc.), iii) the ability to manipulate the position of said objects into desired locations, and iv) the ability to manipulate the viewing angle of the completed room setting. The 20-20 Virtual Planner software application positions static objects in an interior space. It offers the ability to choose finishes and material options for each object. It provides the ability to define a room size and shape, and can modify sizes of non-buildable objects (i.e. walls, doors windows).

The Besta Storage Planner, a computer application from IKEA that provides a set of tools to enable i) the selection of a pre-existing cabinet product or the option to "start from scratch", ii) the presentation of a range of existing pre-designed cabinet products for placement in a room scene, iii) the option to select from a set range of design options for each product (door style and finish colour, hardware style, finish, legs) placed in the scene, and iv) options to save, print, and purchase the resulting product. IKEA's planner combines prebuilt objects in an interior space, and enables users to select from a range of design options (door styles, finishes,).

All of the above Configurators are limited to offering user configuration within a narrow prefixed range of choices. None of the aforementioned systems provides a Configurator which provides users with the ability to configure any product they might possibly want within a defined category of goods, as they all lack sufficient ability to manipulate the complex geometry and relationships between parts found in a majority of manufactured goods. None provide the ability to interchange components of varying geometry, serving the same function and occupying the same location within an assembly, such as replacing a narrow leg with a wide leg and automatically modifying the dimensions of adjacent parts to accommodate. Further, none are able to make such substantive geometric reconstructions within a platform that also supports a parallel ability to modify the dimensions of the overall assembly or its respective sub-components, such as increasing the total height by 100 mm and maintaining the total width but decreasing the width of an internal component by 50 mm. Further, none additionally support the addition, removal, or rearrangement of parts or subassemblies, within the context of such variable components, such that the overall product configuration is substantively altered, such as removing three drawers and adding a cupboard.

What is needed, therefore, is a system overcoming such limitations and implementing a more sophisticated geometric framework and accompanying positioning methodology that supports a large set of rules, equations, dependencies, and data. For maximum utility, such a framework describes and controls a wide array of design options, positioning substitutable components in three dimensional space such that changes to sizes can be made in parallel with the interchange of components that engender stylistic attributes, and also the reconfiguration of components to alter overall product configurations.

BRIEF SUMMARY

Disclosed is a system and method of creating configurators for positioning three dimensional objects or "Parts" of any size and shape relative to various elements of an infinitely expandable "Matrix" along X, Y, and Z axes. The location and size of such Parts can be controlled by designating Anchor Points on each Part, and associating these Anchor Points to Nodes on the Matrix, Axes defined by Nodes on the Matrix, Planes defined by axes of the Matrix, and Cells bounded by Planes of the Matrix. Parts may also be positioned by relating Anchor Points to those of other Parts. Such associative positioning can be adjusted through the use of Offset Values, most commonly defined in X, Y, and Z axes. Such Offset Values can be either fixed numeric values, or the result of equations which take into account a variety of influencing factors, such as the dimensions of other objects, a clearance or tolerance value, a proportion of a distance between specified Nodes, Planes, or Cells on the matrix, and so on.

The creation of this Matrix enables a System Administrator to define the rules, conditions, and specifications of any three dimensional Part in space, with the exact size and location driven by any conceivable and measurable factor. Most commonly, such size and location is related to the size and location of adjacent Parts, thus ensuring compatible and desirable positioning and sizing of all Parts within the overall Assembly. The Matrix and its elements also make it possible for an Administrator to define many Parts that can be interchanged, while maintaining desirable positioning and sizing relative to any other Parts that are in place, so long as rules and equations have been defined by the Administrator for the given combination of Parts. To ensure ease of use, the Administrator can further control which combinations of Parts are allowed to coexist, disallowing combinations that do not possess defined relationships.

An embodiment of the Part Matrix is a Product Configurator, a computer interface accessible to Users possessing no specialized skills, that offers a set of tools to modify aspects of one or more graphically represented Parts in a non-sequential manner, and returns feedback data in the form of images, price, and production information for the customized Part or Parts. Said tools may include discrete or non-discrete size adjustment, interchange of the geometric and material attributes of various Parts, and modification of the Assembly's configuration of Parts. By providing an Administrator with the ability to create a limitless range of Parts, with a commensurate collection of rules and equations governing their use, position, and size, the Administrator is able to populate a Configurator with an enormous scope of design options—potentially encompassing the entire spectrum of product variations within a particular market category.

For end Users of such a system, one benefit is the ability to configure a potentially enormous range of product options—limited only by the data investment made by the Administrator—without need to acquire the skill or knowledge typically required of such a flexible design platform. Such enormous range has hitherto only been available through use of engineering CAD systems, which typically require a substantial amount of user learning, and a substantial amount of calculating to determine appropriate design attributes and settings. Even a skilled CAD user has to figure out every dimension, every tolerance, every material, construction details, etc. In using the described Configurator, wherein technical requirements and limitations have been encoded, the User has the tools to decide what they want, making the appropriate selections for style, size, and functionality without concern for construction details. This convenience has enormous appeal in any market where high product variation exists, such as furniture, footwear, jewelry, or apparel, as it greatly simplifies the process of acquisition for both the customer and the producer.

Features and Advantages

A Framework to position Three Dimensional Parts provides a platform upon which a system Administrator can define any three dimensional Part, and control the size and position of that Part relative to other designated Parts or other factors.

The system positions an infinite range of parts in precise relation to one another. The framework is such that Parts of virtually any shape can be related with dimensional precision, creating a virtually infinite range of Part combinations and Subassemblies, limited only by the creativity and time investment of the system Administrator.

The existence and position of a Part can be entirely independent of the existence and position of any other Part. That is, activation of a Part's use and placement is only contingent upon another Part if the Administrator deems it so through the use of rules and equations. The system does not constrain the Administrator with the requirement for specific Part combinations.

The system enables creation of PartGroupClasses, within which PartGroups can be interchanged. Parts can be grouped together as "PartGroups", such that relationships between a set of Parts fulfilling a particular function can be described. PartGroups make it easy to isolate and define a group of Parts that are inter-related, so that an entire PartGroup can be removed or replaced, ensuring all affected Parts are properly controlled without concern for unaffected Parts. PartGroups are distinct from the commonly understood concept of "subassemblies" in that the Parts in the PartGroup do not necessarily connect or interact with one another, they may be grouped according to function or material or some other classification. Within such a classification, or PartGroup-Class, it is possible to have multiple substitutable Part-Groups. For example, all the doors and drawer fronts in a cabinetry Configurator may be collected into a PartGroup-Class that is distinct from a PartGroupClass that handles hardware. In such an example, the user may make a selection to change from one Hardware PartGroup to another, thus replacing all occurrences of hardware in a single step, substituting them with a PartGroup that has been developed by the Administrator to contain Parts that complement one another. In a more complex example, a PartGroupClass managing all the trim elements of a cabinet may be created, wherein the dimensions and shapes of the trim components in a PartGroup must fit together. For example, trim Part-Group "A" may have a vertical element used as a leg, which meets with the underside of a horizontal top panel that itself has an applied edge trim. The dimension of the leg and trim must be such that the top fully covers the leg. In changing to a different trim PartGoup "B", a new leg and top trim of different dimensions may be used, again with dimensions calculated to ensure proper fit, and positions controlled by offsets from the designated Nodes. Use of PartGroups and PartGroupClasses put the calculations and control of part positioning, and the selection of Parts that complement one another, into the hands of the Administrator, who encodes each option once, for repeated use thereafter. Without such capabilities, it would be up to the User to ensure all parts fit together, undermining the goal of ease of use.

It is possible—and beneficial—for Parts within a Part-Group, in separate PartGroups or even in separate Part-GroupClasses, to possess geometric details that enable the connection of Parts into an Assembly. Examples of such geometry include pilot holes for screws, or mortises and tenons in mating wood components. In other cases, it may be preferable to omit such geometric details from Part descriptions, and instead associate instructional information to a Part that would be retrieved at the time of manufacturing. In addition, rules and equations may be implemented to control when such attachment information is invoked. There may be specific conditions under which certain parts are required to connect, while other conditions would demand alternate connections. It is up to the Administrator, when creating the Parts, to define the desired geometry, specifications, and rules and equations to govern all such behavior.

Nodes on the Matrix may be designated as specific locations, such as "bottom left front corner of the Assembly". As the Assembly is reconfigured, the Node that is thus designated will change accordingly. This makes it possible to associate a Part with a particular position within the Assembly, even as the size and shape of the final Assembly is altered.

Axes may be designated as specific locations on the Matrix, such as "front edge of the top of the Assembly". Typically, the bounding Nodes would be located at the outer limits of an Assembly that is configured on the Matrix, but this is not necessarily the case. As the size and position of the Assembly is altered, so are the relevant Nodes.

Planes on the Matrix may be designated as specific Contexts, such as "top face of the Assembly". Planes are bounded by four Nodes that share a common position on one of the X, Y, or Z axes. As the size and position of the Assembly is altered, so would the assigned bounding Nodes of the Context.

Cellgroups may be designated containing one or more "Cells" on the Matrix, bounded by eight Nodes in three dimensional rectilinear space, or a variable number of nodes in a non-rectilinear matrix. By making Cellgroups out of varying groups of Cells, it is possible to achieve an enormous range of configurations of adjacent Cellgroups.

The system allows designating Nodes, Axes, Planes, and Cellgroups with attributes or functions. For example, a building Configurator may have a Cellgroup allocated as a room, a wall Configurator may have an Axis assigned to control baseboard, and a window Configurator may have a Cellgroup allocated as a pane of glass, bounded by the window frame and mullions. Such allocations are useful as a means for the Administrator to write rules specifying the insertion of specific Parts or PartGroups, of a particular PartGroupClass, in particular locations under particular conditions. For example, a Cellgroup in a cabinet Configurator allocated as a drawer may require a certain set of Parts for the drawer box and slide mechanism, while a Cellgroup allocated as a room within a building may require Parts representing walls and potentially the various components of such walls. To take full advantage of the system's capabilities, all such Parts may be defined with appropriate Offsets from bounding Nodes, to ensure they fit together as intended.

Axis, Context, or Cellgroup dimensions may be adjusted by changing the distance between Nodes. The distance between Nodes, and the commensurate size of entities associated with affected Nodes, is flexible and independent of PartGroup Allocations. A User can allocate a PartGroup for a chosen functionality or attribute, then adjust the position of Nodes, then reallocate a different PartGroup, and so on. This is made possible by the parametric nature of the Matrix and Node system, which controls the positioning of all potential Parts and PartGroups that have Anchor Points associated with the Matrix.

The Partgroup assigned to a Node, Axis, Context, or Cellgroup may be changed, and appropriate dimensions for the new Partgroup adopted. A Node, Axis, Context, or Cellgroup allocation can be further enhanced when the User chooses amongst stylistic variations available for that Allocation. For example, there may be numerous types of drawers, styles of drawer fronts, and options for drawer hardware made available by the Administrator. With appropriate rules and equations in place, a Cellgroup allocated as a drawer may substitute one style for another, with each style possessing its own dimensional requirements. One drawer style may have mechanical sliding mechanisms that require the drawer to be 25 mm narrower than the space between adjacent panels, while a different drawer may have a traditional wood construction that only requires a 12 mm clearance, but also requires additional Parts. Such differences can be embedded in the system such that the size of all Parts is controlled by the size of the Cellgroup, which is in turn controlled by the position of the relevant Nodes, adjusting to whatever dimensions the user specifies within minimum and maximum boundaries.

The MaterialFinish specified for a Part or PartGroup can be changed. A Partgroup selection can be further enhanced through the provision of multiple MaterialFinish choices. MaterialFinish does not affect the geometry of the Part or Parts, but rather the material the Parts are made from, and the finish that is applied to that material. For example, a wood part may be available in a range of species, and a range of stain or paint colors for each species. The resulting range of MaterialFinishes might be: "Oak-BlackStain, Oak-Clear-Lacquer, Maple-BlackStain, Maple-AmberStain, Maple-Unfinished". Each category of parts would require their own range of MaterialFinishes, and each individual part may only be available in a subset of the total range. For example, metal handles might be available in a range of metals (brass, aluminum, etc.), and finishes (polished, brushed, matte, etc.), but each specific handle Part is likely only available in some of the total range. The system manages such subset organization, and the application of finishes to all Parts in a Partgroup, such that the User is ensured of being offered only valid selections.

Specifications and limitations can be associated to individual Materials. While Materials may be substitutable within different classes, there may be some variation in their individual properties, such as dimensions and strengths. For example, if a Part is made of oak, it may be able to support a greater load than if an alternate Part serving the same purpose is made of pine. For this reason, the Administrator has the ability to define and control conditions that are related to a Material, such as maximum size.

Multiple PartGroups of different classes may be managed and changed as a bundle. Once an instance of the system has been seeded with data such that there are multiple Part-GroupClasses, each storing multiple PartGroups, it becomes possible to manage PartGroupCombinations of Part-groups—one selected from each PartGroupClass. For example, a PartGroupCombination for a cabinetry system may contain a selected PartGroup for hardware, doors and drawer fronts, trim, base elements, and top elements. If numerous such PartGroupCombinations are stored in the system, it is more convenient for Users to change the overall style and construction of the product in a single step, while retaining their settings for Cellgroup configuration and dimensions. A kind of "re-skinning" operation takes place, which is of great utility to Users.

Specific Node positions may be identified and used in rules and equations. Nodes on the Matrix can be identified according to specific attributes, thereby enhancing control and versatility. For example, one option is to encode the identification of the "highest" Node on the Matrix that is "farthest to the left", that has been used in the boundary of a Context or Cellgroup (all higher Nodes or Nodes farther to the left being empty space). As such, a rule may be formulated that places a particular Part or subassembly at the Assembly's top left corner. If the user decides to allocate a function to another Context or Cellgroup above, the Node that is identified as "uppermost" shifts and the collection of Parts redefines itself accordingly. It is thereby possible to easily create entirely original configurations. For example, the user creates a chest with three drawers. Analysis identifies that the uppermost drawer is at the top of the assembly, and thus places a panel above it, forming the top of the cabinet. Then, the user selects a Cellgroup immediately above the top drawer, and allocates this as a cupboard. The system recognizes that the drawer is no longer at the top of the assembly and moves the panel, repositioning it above the cupboard.

In some applications, there may be Parts that either do not change in size, or changes in their size are independent of the sizing of the Matrix. Instead, the size of such parts may be controlled by external factors, such as a material thickness, or a discrete value provided by the User. In such cases, a single Anchor Point of a Part may be associated with a specific Node on the Matrix, with or without offset values.

In some variations, it is useful to define various options for how Parts intersecting at Nodes fit together. For example, the point at which the top lateral panel of a cabinet and the outermost vertical panel intersect—the "top corner"—could be constructed such that the end of the top panel butts into the inner face of the vertical panel, or vice versa with the end of the vertical panel butting into the underside face of the top panel. To provide maximum utility and flexibility to the Administrator, this issue is handled through Node Dominance, which provides the option to designate parts intersecting at a Node as "vertical dominant" (the vertical parts carry through and the horizontal parts butt into or are split by them) or "horizontal dominant" (the horizontal parts carry through and the vertical parts butt into or are split by them). When combined with PartGroups an Administrator may designate the relationship between Parts in different PartGroups with different Node Dominance. That is, one Partgroup containing trim parts for a cabinet might have the top corners set to be vertical dominant, and another Part-group containing trim Parts might have the top corners set to be horizontal dominant. This enables a broad spectrum of variations in product configurations and styles available to the user.

To further increase the utility of the Node Dominance functionality, NodeDominanceGroups may be created which identify the Node Dominance in various positions within an assembly to be used together. For example, the top of a cabinet might be set to Horizontal Dominant, the Bottom might be set to Vertical Dominant, and any lateral components in between might be set to Vertical Dominant. A second NodeDominanceGroup might have a different combination. These groups simplify the process of designating Node Dominance for any desired PartGroup.

While there is great benefit in using Axes, Contexts, and Cellgroups to control the inception and positioning of Parts, there are also cases when this is not suitable. Some Parts do not conform to the geometry within the defined Matrix, whether rectilinear or otherwise, and therefore need an alternate means of positioning, that retains the versatility and control previously described. Such parts can be controlled by association with a single Node situated at a particular point of an Assembly, such as the bottom front left corner. The Part could be further controlled by establishing X, Y, and Z offsets in linear coordinates, and if needed, three axes of rotation to turn the part into a position that is not aligned with the root Matrix. By utilizing rules or equations in the offset value calculations, it is possible to position a Part virtually anywhere in space, and still maintain its relationship with other Parts. Examples of such Parts include a curved leg on a chair, a staircase within a building, or a logo graphic stitched onto an article of clothing. These Parts are still defined on the Matrix, and thus retain compatibility with the adjustable distance between Nodes, and the ability to substitute Parts or Part Packages with like replacements. This positioning method makes it possible to define virtually any object or assembly in three dimensional space.

Structural attributes may be modified or Parts or Part-groups substituted through controlling equations. An example use is the ability to control the substitution of parts that vary in functional or structural attributes, rather than the stylistic ones previously discussed. For example, a panel that forms the sidewall or "gable" of a cabinet may possess geometry that represents joinery for the part's intersection with adjacent parts. If a user makes a selection to add a drawer, then equations for geometry representing holes for the mounting of drawer hardware could automatically insert such holes in the required location. If a shoe configurator has an option selected to add an ankle strap, a controlling equation may automatically substitute the mating heel component with an identical copy that possesses attachment holes. From the User's perspective, the part appear unchanged, but from a manufacturing perspective, the necessary geometry and instructions are included.

Various data may be generated from dimensions determined with the Matrix. By definition, the dimensions of all Parts placed within an Assembly on the Matrix must be known, with the level of precision and in measurements embedded by the Administrator. As such, the system may use this information in all manner of business activities, formulation of a Bill of Materials, purchase orders for third party manufacturers, and shop floor instructions, including CNC machining code, for in house production. In combination with embedded data that tracks material selections, the system may also calculate overall product weight for shipping, calculate price, and generate purchase orders for suppliers.

User-control settings may be stored to recreate the wider array of generated data. A plethora of information may be derived from the initial User inputs (cellgroup designations, style choices, dimensions), and may be replicated. It is not necessary to store this vast array of data, only the original user settings.

An assembly may be created from scratch. A User can create an assembly from scratch, allocating elements of the Matrix to functions from the options made available by the Administrator, selecting PartGroups from a corresponding PartGroupClass, then adjusting dimensions of the Matrix. Such a process may be done extremely rapidly, with no need for complex calculations, access to engineering data, or specific domain knowledge—as those are all encoded by the Administrator prior to User use.

Preconfigured assemblies may be retrieved and modifications made. A User may also retrieve an existing assembly from a stored library of assemblies, and make either minor or substantive changes. For example, an assembly representing a chest of drawers in a contemporary style might be retrieved from the library of a Furniture Configurator, then have its total width adjusted, and a different style of drawer fronts selected, in two simple steps. As another example, the same chest of drawers might have its upper drawer converted into a cupboard, it's middle drawers deleted, its lower drawer converted into a cupboard, its overall height and width and individual cellgroup height and width altered, new Partgroups with different stylistic attributes selected for its trim and doorfronts, and become a classic armoire, all in a matter of seconds.

The system provides different value to different potential user groups. The described capabilities are of great value to numerous parties. End customers benefit from the ability to easily configure whatever product they might want. Manufacturers may use the system as a means of reducing the time and expense of product development, converting a labour intensive process often taking months or years into one that takes a few minutes. Interior designers and retailers may replace the time consuming activity of "sourcing" products with the ability to quickly and easily configure exactly what they want.

Multiple Matrices may be used in a greater three dimensional space. The Matrix enables the relative positioning of objects or Parts in three dimensional space. Such a tool has enhanced value when expanded to a higher level control, wherein multiples matrixes may be positioned within a larger matrix. This facilitates the easy positioning of, for example, pieces of furniture within a room, where the positions may be on angles or at locations that are not easily controlled within a matrix that defines the room itself. It may also be useful when creating a piece of furniture that has subassemblies set at unusual angles relative to one another. Rather than working with complex angles and dimensions, a Matrix can be defined with simple X,Y, and Z axes relative to another matrix, using six control values: origin-to-origin X, Y, and Z distances, and X, Y, and Z rotational values. As such, any possible relative orientation and position may be defined. There is no limit to the number of matrixes that may be correlated, and no limit to the number of levels of nesting. An entire city may be defined in this manner, with a matrix for each neighborhood, for each block within that neighborhood, for each building on that block, for each floor of that building, for each room on that floor, for each wall of that room, for each door/window/fixture on that wall, for each object within that room, for each subassembly of that object, and each Part of that subassembly. Each entity at each nest level may have multiple substitutable options.

BRIEF DESCRIPTION OF THE DRAWINGS

In the drawings, closely related figures and items have the same number but different alphabetic suffixes. Processes, states, statuses, and databases are named for their respective functions.

FIG. 15 shows a search page of an example User Interface.

FIG. 29 shows a delivery scheduling page of an example User Interface.

DETAILED DESCRIPTION, INCLUDING THE PREFERRED EMBODIMENT

Terminology

Figure 1:
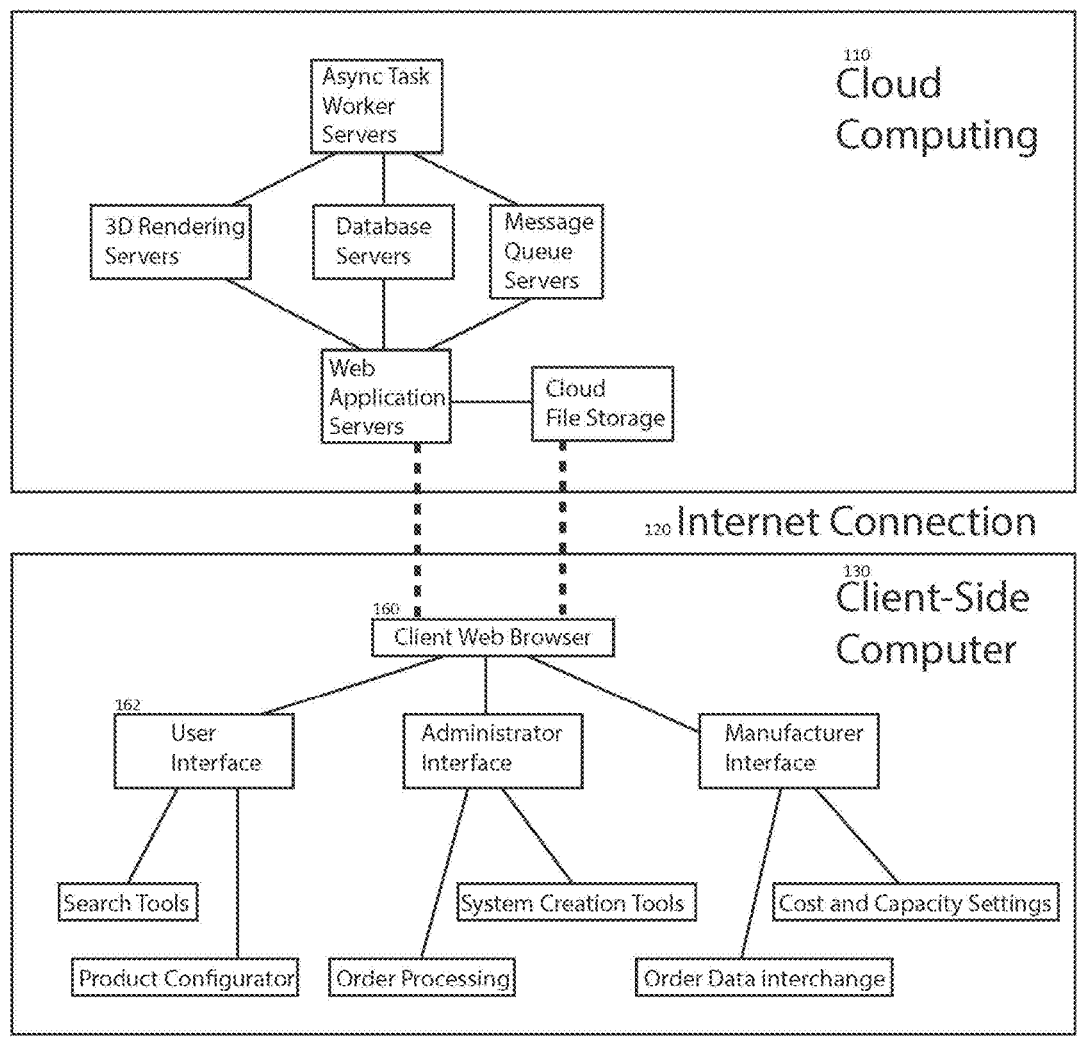
FIG. 1 is a chart showing overall system architecture.

The terminology and definitions of the prior art are not necessarily consistent with the terminology and definitions of the current invention. Where there is a conflict, the following definitions apply.

Administrator: In order to create a specific Configurator with the system and tools defined in this document, it is necessary to populate the system with actual Parts and PartGroups, define PartGroupClasses, create NodeDominanceSets, define CellGroupAllocation options, and so on. This is the work of the Administrator, and is done in order to create a Configurator that can be presented to the User. The Administrator is typically highly skilled and knowledgeable in the domain that the Configurator addresses, and will spend considerable time encoding that knowledge into the rules and equations that govern a Configurator's functionality.

Anchor Point: The position of any three dimensional object, or Part, can be controlled through the positioning of one—or more commonly two—Anchor Points. An Anchor Point is a designated coordinate position relative to the geometry of the Part. A preferred approach is to define the bottom-front-left corner and the top-rear-right corner of the Part as Anchor Points. If a change is made to one of these positions, the size and shape of the Part changes. If correlating changes are made to both points, the position of the Part relative to the origin changes, but not its size or shape.

Assembly: A group of Parts that are related through positioning controlled by one or more shared Nodes.

Axes: Vectors that are parallel with the root X, Y, and Z axes of a rectilinear Matrix.

Cell: A polygon or volume of space defined by vectors connecting a group of Nodes. Most commonly, a rectangle bounded by four nodes in two dimensional space, or 8 nodes in three dimensional space, but may also be a non-rectangular shape, for example as might be appropriate when devising a Matrix for the definition of footwear.

Cellgroup: Multiple adjacent Cells defined as a group for the purpose of a single Allocation.

Cellgroup Allocation: To facilitate the placement of Parts, PartGroups, and Subassemblies within an assembly, it is possible to assign a Cellgroup Allocation to a Cell or Cellgroup. An Allocation is associated with a particular PartGroupClass. For example, Allocations in a cabinetry Configurator might be "Drawer", "Cupboard", "Open-Shelf", etc. In a shoe Configurator, they might be "Sole", "Heel", "Top piece", "Quarter", etc. It is also possible, and often desirable, to have an Allocation of "Empty".

Configurator: A software tool used to assist in the selection and modification of a set of elements, with rules and/or equations encoded such that the tool may be used without knowing or understanding the underlying factors. Often associated with systems of geometry and physical products, but not necessarily the case.

Context: A Context is a Plane that is parallel with the root XY, XZ, or YZ planes of a rectilinear Matrix, and intersects with Nodes in the opposing Axis. For example, an XZ Context is parallel with the Plane defined by the root X and Z axes, offset to intersect with a Node on the Y axis. It is preferable to describe specific positional Contexts of an Assembly within the Matrix, such as the generic conditions of Top, Bottom, Leftmost Face, Right-most Face, Mid-Lateral, Mid-Vertical. It is also preferable to define more case-specific Contexts. In the example of a cabinetry Configurator, one such Context might be "Adjustable Shelf". Each Context occupies a defined position on the Matrix, and rules are written to describe what Parts, PartGroups, and PartGroupClasses should have positions associated with each Context, and the conditions of such positioning, such as Offsets.

Coordinate Partpositioning: A method of positioning and controlling one Part, or multiple Parts forming a PartGroup, relative to one specific Node on the Matrix. Rules and settings defined by the Administrator may dictate that Parts will be associated with a Node, and may be sized relative to factors independent of changes to the relative positions of other Nodes on the Matrix, with additional Offsets as are required for adjacent Parts to intersect in the desired manner. Parts anchored to a single Node may also be rotated in space to achieve positions that are not aligned with the root Matrix.

Discrete and Non-Discrete Size Adjustment: Discrete size adjustment is restricted to pre-determined increments, such as 12, 24, 36, etc. Non-discrete adjustment allows any value to be defined, up to a specified level of accuracy determined by the chosen units of measurement (i.e. thousandths of an inch, or kilometers, or milligrams).

Hybrid Partpositioning: A method of positioning and controlling one Part, or multiple Parts forming a PartGroup, using a combination of Coordinate, Linear, Planar, Spatial, and Parametric Partpositioning methods. Rules and settings defined by the Administrator may dictate that Part positions are defined in relation to a combination of Cell, Context, and Node positions, the positions of other Parts within the Assembly, as well as additional Offsets as are required for the Part's position and size to be controlled in the desired manner.

MaterialFinish: Various Parts and PartGroups may be made available by the Administrator in more than one MaterialFinish. This is the combination of the base Material a part is made of, such as maple or oak if wood, or aluminum or steel if metal, and the Finish that is applied to that material. In the case of wood parts, Finish typically takes the form of an applied material such as lacquer, and is often available in a range of stain colours. For metal parts, Finish might be "polished" or "brushed", etc.

Matrix: A Matrix is a collection of Nodes most often forming a rectilinear grid following X, Y, and Z axes, but may be amorphous as would be appropriate for defining assemblies such as shoes or apparel.

MultiMatrix: A mating of multiple matrices. It may be preferable to define portions of an assembly, or multiple independent assemblies on separate matrices that have independent controls, yet have a defined geometric relationship. Such a scenario, called a "MultiMatrix", requires an additional level of control, defining the relationship between the matrixes, such as the colinearity of one axis line in each plane for each of the mating matrices.

Node: A node is a defined point in space relative to the root 0,0,0 origin point in that space. This point, or Node, is a position in 3D space from which a multitude of other positions can be referenced. This facilitates a parametric capability similar to what is found in CAD systems, where multiple objects and geometries can be repositioned as a group. By creating multiple Nodes, many groups of geometry can be controlled relative to one another. If a system Administrator utilizes Nodes to encode precalculated positioning for multiple objects, a subsequent system User is freed of the technical skills normally required to manipulate complex geometry.

Node Dominance: A primary function and utility of Nodes is to define the intersection points of Parts. Such an intersection can typically take place in a number of different ways. Node Dominance defines a range of all possible intersection possibilities, giving either the Administrator or the User the ability to select which intersection scenario should be applied. In an X/Y/Z grid Matrix, where Parts would typically be placed within the XY, YZ, or XZ planes, these intersections could be categorized as the intersection between XY and YZ planes, XY and XZ planes, and YZ and XZ planes. Using an example of the XZ (horizontal) and YZ (vertical) planes, which could form the top/bottom and sides of a box, respectively, it can be seen that the intersection between these planes could be such that a horizontal panel would take precedence over a vertical panel, or vice versa. This is described as "horizontal dominant" and "vertical dominant".

Node Dominance Sets: It is sometimes preferable to define the NodeDominance of intersections at different positions within an Assembly. For example, an Administrator might wish to make the intersection between the topmost horizontal panel "Horizontal Dominant" and all other intersections at lower levels "Vertical Dominant", or alternately, make all intersections "Horizontal Dominant". Node Dominance Sets manage such groups of Node Dominance settings, making it possible for the Administrator or User to change from one NodeDominanceSet to a different NodeDominanceSet in a single simple step. It is also possible to associate PartGroups with a particular NodeDominanceSet, ensuring that the specified Parts are positioned in a controlled, predefined manner, which gives flexibility in such positioning from one PartGroup to another.

Node Offset: Parts are positioned on the Matrix by relating specific Anchor Points on a Part, such as the "front left bottom corner", to specific Nodes, such as the "topmost front left" node. When multiple Parts are intended to connect at a particular Node, such as when a vertical part meets a horizontal part, it is necessary to position one or more of the Parts at some distance away from the Node, in one or more axes. This distance is the Node Offset, and is configured by the Administrator to ensure compatibility in the positioning of Parts.

Linear Partpositioning: A method of positioning and controlling one Part, or multiple Parts forming a PartGroup, relative to two specific Nodes. Rules and settings defined by the Administrator may dictate that Parts will be associated with two Nodes, and will be positioned and sized relative to those Nodes, with additional Offsets as are required for adjacent Parts to intersect in the desired manner. The size and position of the Part changes as the distances between the referenced Nodes changes.

Origin: The point of intersection of the X, Y, and Z axes in three dimensional space, ascribed with the position X=0, Y=0, Z=0, or "0,0,0".

Parametric Partpositioning: A method of positioning and controlling one Part, or multiple Parts forming a PartGroup, relative to one or more other Parts and Offsets. Rules and settings defined by the Administrator may dictate that Parts will be associated with one or more other Parts, and will be positioned and sized relative to those Parts, with additional Offsets as are required for the Parts to intersect in the desired manner.

Part: A geometric object that is positioned in space relative to the location of one or more Nodes, a Context, or a Cellgroup Allocation on the Matrix, or relative to other Parts.

PartGroup: A collection of Parts that an Administrator configures for control as a group. A PartGroup is typically a set of parts that are invoked if a certain set of conditions are established, such as specific User selections for style options, or the creation of a particular CellGroupAllocation. Anchor Points of Parts within a PartGroup are typically anchored to specific Nodes, with NodeOffset values set such that the Parts intersect with each other in the desired manner. Parts within a Partgroup may further be controlled by more specific conditions, such as NodeDominance (i.e. "If the topmost horizontal plane is set to HorizontalDominant, add trim components around the edges of the top panel and remove trim components from the top edges of the vertical panels") or dimensional thresholds (i.e. "if the total width of the assembly exceeds 900 mm, add a centre support leg".)

PartGroupClass: A set of PartGroups that serve the same function or possess the same features, and are substitutable, comprise a PartGroupClass. For example, a selection of cupboard doors would comprise the "Door" PartGroupClass. This facilitates the management and selection of options within a given category.

PartPositioning: Methods of defining and controlling the position of Parts in three dimensional space. See "Coordinate", "Linear", "Planar", "Spatial", "Parametric" and "Hybrid" PartPositioning.

Planar Partpositioning: A method of positioning and controlling one Part, or multiple Parts forming a PartGroup, relative to a Context. Rules and settings defined by the Administrator may dictate that Parts associated with a particular Context will be positioned and sized relative to the Nodes that define that Context, with additional Offsets as are required for Parts to intersect in the desired manner.

Plane: A flat surface defined by alignment with all lines on any two of the X,Y, and Z axes. There are three such planes: XY, YZ, and XZ, defined by alignment with their respective Axes.

Solution Space: The range of possible design variations within a system comprises the Solution Space. It is determined by the number of PartGroupClasses, CellGroupAllocation types, the boundaries of the defined Matrix, and the allowable size increment determined by the Administrator. A relatively small number of options facilitates a quantity of permutations and combinations reaching millions or billions of variations available in the Solution Space.

Spatial Partpositioning: A method of positioning and controlling one Part, or multiple Parts forming a PartGroup, relative to a Cell or Cellgroup. Rules and settings defined by the Administrator may dictate that if a particular CellGroupAllocation is created, an associated Part or PartGroup will be associated with one or more of the nodes that define that CellGroup, with additional Offsets as are required for the Parts to intersect in the desired manner.

Subassembly: As traditionally defined, a Subassembly is a set of Parts that comprise a unified aesthetic or mechanical function. The Parts in a Subassembly are typically in physical contact with one another, forming a discrete whole that is placed within a larger Assembly, and typically either all of the Parts in the Subassembly are present or none of them.

PartGroupCombination: If the Administrator develops a system that possesses multiple PartGroupClasses, each containing multiple PartGroups, it is preferable to create preset combinations of PartGroups for easy selection and changeover (one click instead of multiple clicks). This set of PartGroup selections is called a PartGroupCombination.

User or End User: The User is typically someone who wishes to easily configure an Assembly without possessing or using specialized domain knowledge. The User will work with the range of options and tools defined by the Administrator to create an Assembly that falls within that Solution Space.

Operation

In the following detailed description of the invention, reference is made to the accompanying drawings which form a part hereof, and in which are shown, by way of illustration, specific embodiments in which the invention may be practiced. It is to be understood that other embodiments may be used, and structural changes may be made without departing from the scope of the present invention.

The platform possessing previously described attributes is first populated with geometric entities representing Parts, and rules and equations that manage those parts. Such a process is typically undertaken by a skilled Administrator. Once the system has been populated, it is ready for general use by the Users. In a preferred embodiment, an Administrator populates the system with Parts that are useful in the configuration of wooden cabinetry, then the User configures a cabinet.

Administrator Functions for a Rectilinear Cabinetry Configurator

System Architecture

Referring to FIG. 1, computer systems facilitate the display and capture of settings, as well as computations required to generate them. One example of such computer system includes processing and data storage both on client side, within a User's computing device 130, and in the cloud 110, utilizing processing and data storage available via the Internet 120. The primary interface between the client side and the cloud is typically web browser 160. A User Interface 162 is displayed in such browser and varies depending upon permissions granted. General use may be openly available on the internet, and allow any User to access a system that has been constructed by an Administrator, with the various tools and capabilities described herein. Access for the Administrator to modify the system's attributes may be restricted by password or other means of security. Other levels of access could also be established. For example, suppliers might have access to data specific to material requirements and schedules, and computer files to control CNC machinery. In the cloud, various types of servers and storage devices with specialized capabilities might be utilized for specific functions, to facilitate fast and stable system operation.

Define a Matrix of Nodes

Figure 2:
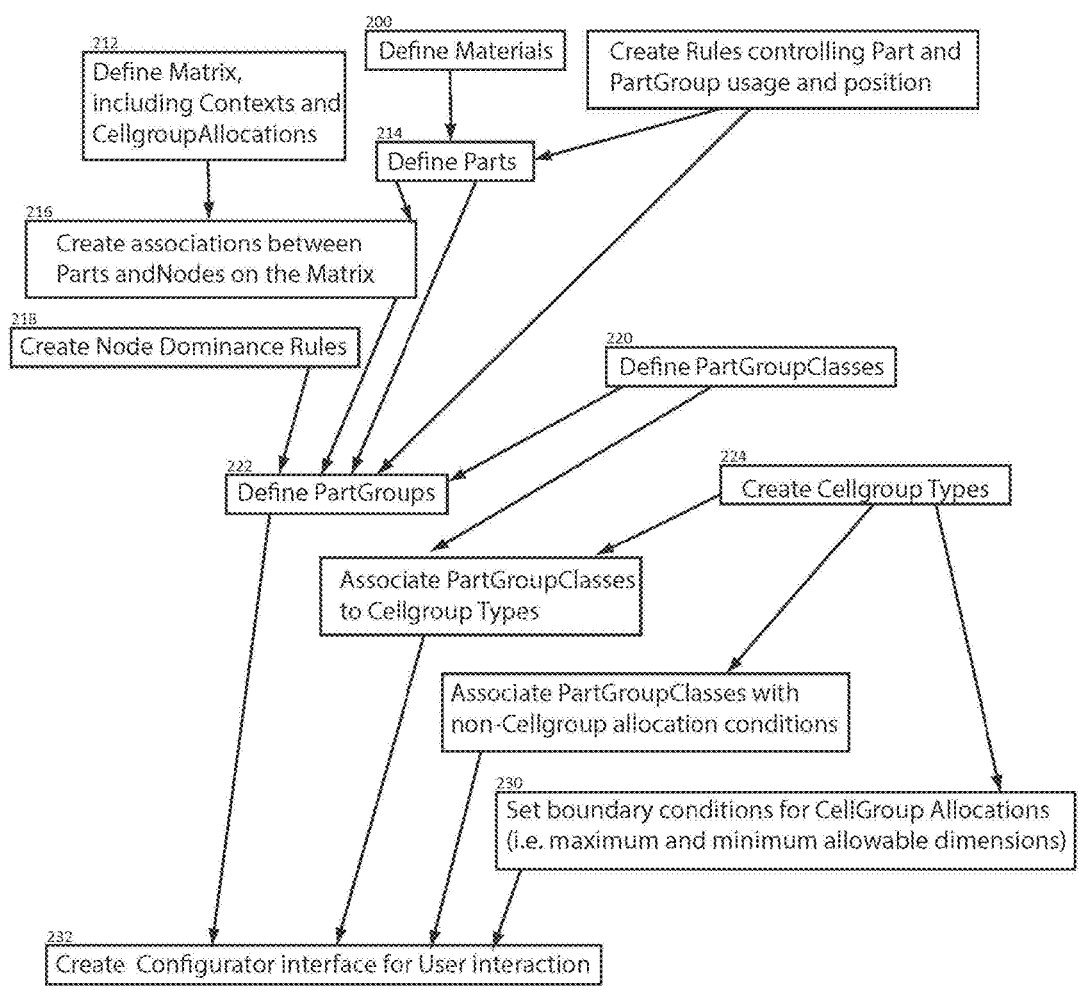
FIG. 2 is a flowchart showing an Administrator process.
Figure 4A:
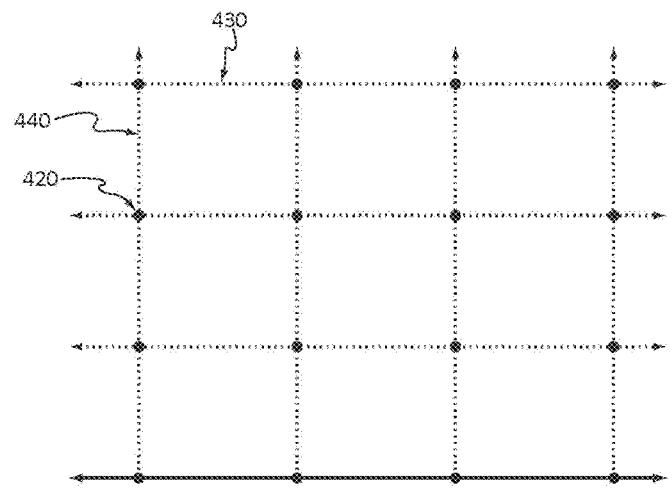
FIGS. 4A and 4B are 2-dimensional and 3-dimensional views of the rectilinear Matrix.
Figure 4B:
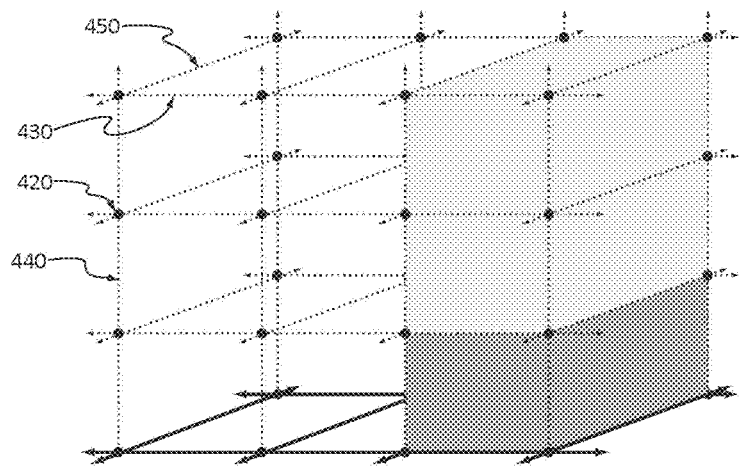
Figure 5:
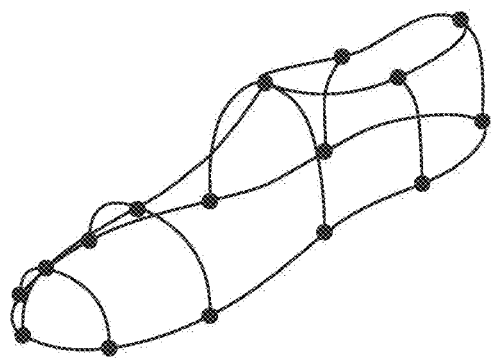
FIG. 5 is a view of a non-rectilinear Matrix.

Referring also to FIG. 2 and FIGS. 4A and 4B, an Administrator defines 212 a rectilinear Matrix consisting of a network of Nodes 420 that form axis lines on X (width) 430, Y (height) 440, and Z (depth) 450 axes. Such a network is infinitely expandable in the number of nodes and axes it might possess, but a typical assembly configuration may only utilize six X axes, three Y axes, and two Z axes, which define a single depth dimension for the matrix (an assembly could achieve multiple Z depths by either increasing the number of Z axes or working with multiple matrices). If the Matrix is non-rectilinear, for example as shown in FIG. 5, a more complex definition of Node relationships is required, and as such the Matrix may be dedicated to the definition of a particular form, such as a shoe or piece of jewelry, rather than being infinitely expandable.

Create Materials

The Administrator defines 200 Materials that are associated with Parts. Information defining each Material includes fixed and variable dimension parameters, cost and weight factors, supply source information, and any other data that may be used by other components in the system. For example, a Material created to represent panels in a piece of furniture would include a parameter for the thickness of that material, which would not be modifiable, and parameters for length and width that the panel was supplied in, to manage supply requirements and restrict furniture dimensions to allowable maximums.

Create Parts

Figure 6A:
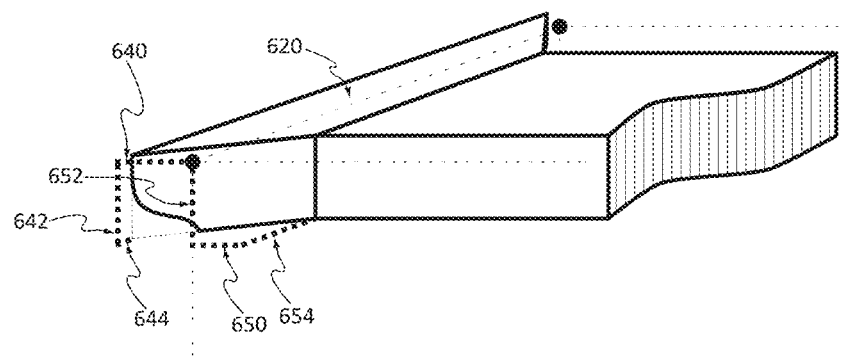
FIGS. 6A and 6B illustrate a panel part with different adjacent trim Parts with complimentary Offset values.

In addition to defining the Matrix and Materials, a family of Parts is defined 214. Referring also to FIG. 6A, each Part has one or more Anchor Points defined, that will be "anchored" to Nodes on the matrix, typically with defined Offsets 640 642 644 650 652 654, and typically through the implementation of one or more Partpositioning methods. Each Part must also be correlated with one or more MaterialFinishes, which provide associations to any size limitations, costing, images, and any other data that is controlled at the Material level.

A Part may have its position and size determined, using the available Partpositioning methods, by calculations that reference one or more variables that incorporate parameters such as part location, part material, adjacency of other parts or attributes, one or more dimensions of a part or combination of parts, stylistic selections or settings, or any other piece of data that can be captured by the system. Such calculations may be written in the form of conditional IF/THEN statements, through an interface accessible by the Administrator. For example, if a panel is associated with the uppermost Context in the Assembly, a different Part may be applied to its front edge than that used for a panel associated with the bottom Context of the assembly. If the top panel is to be combined with a larger trim Part, the dimensions of the panel reduce to maintain the desired total dimension, and expand when a smaller trim Part is selected. Additional Parts defined by the Administrator populate all positions on the matrix that might be required to construct the desired range of assemblies. Further control of Part placement is handled through the development of PartGroups and PartGroupClasses.

Each Part may be programmatically assigned for activation under certain conditions. Parts are associated with the presence of Cellgroups, in addition to their associations with positions on the Matrix and stylistic variables such as material, finish, and shape.

Create Rules for Node Dominance and NodeDominanceSet

Figure 8A:
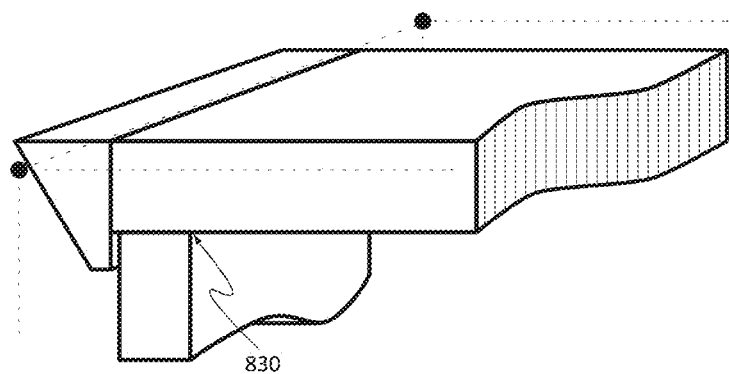
FIGS. 8A and 8B illustrate differences between Vertical and Horizontal Dominance.
Figure 8B:
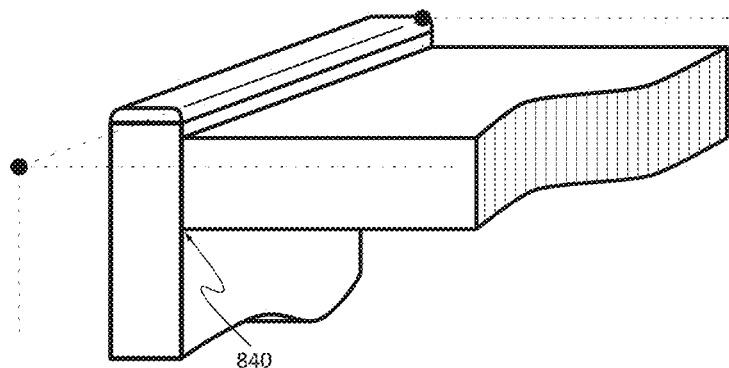

Relationships between Parts that are positioned on the Matrix are defined by the Administrator. Wherever parts intersect, a specification is required as to the geometry of all Parts involved in the intersection. In the preferred embodiment, where parts are most commonly positioned on one of the three planes of a rectilinear Matrix, these intersections occur between parts meeting at right angles (90 degrees). Referring also to FIGS. 8A and 8B, when a horizontal Part meets a vertical Part at a Node, the intersection can be either "Horizontal Dominant" 830 or "Vertical Dominant" 840, depending on the aesthetic and structural considerations and decisions made 218 by the Administrator. Different Parts meeting in exactly the same situation may have different specifications, to achieve different aesthetic or structural goals.

Create PartGroupClasses

In order to further simplify the design process for the User, the Administrator can define 220 groups of Parts that can be substituted as a set, rather than individually. Such sets typically align with the Part Classes previously discussed. For example, PartGroupClasses might be defined for Faces (i.e. cupboard doors and drawer fronts), for Hardware (knobs and handles), or Trim (edge treatments around panels, and structural members that form the skeleton of an assembly).

Create Axis-, Context-, and CellgroupAllocation Types

Many Parts and PartGroups are associated with the designation of Axes, Contexts, and CellGroups, as a convenient way of providing an unskilled User with the ability to quickly configure an assembly. To achieve this, the Administrator defines 224 the types of Allocations that are desired, then defines associations between each type and particular Parts, or PartGroupClasses. For example, a Cellgroup might be defined for "Drawer", and correlated with a PartGroup-Class called "Drawers", which contains a variety of Part-Groups that represent the parts in different styles of drawer constructions. If the "Drawer" Cellgroup is allocated to one or more cells on a Matrix, the User would then select which of the "Drawer" PartGroups to assign, and that set of Parts would be positioned according to the boundaries of the selected CellGroup.

Create PartGroups

While Parts can be defined and controlled on their own, this system is most beneficial when they are incorporated 222 into PartGroups of different PartGroupClasses. In such a PartGroup, the Administrator can specify the conditions under which a Part is activated in a particular location, and the desired Offset values that complement the positioning of adjacent Parts. It is through the coordination of the positions of Parts in the PartGroups that it becomes possible for the User to replace Parts without having to verify or adjust the fit between them.

In an example of the capabilities outlined thus far, the use and specifications for a particular table leg in a table configurator might depend on i) the selection of a particular PartGroup from a "Legs" PartGroupClass, ii) the selection of a specific Finish available for the PartGroup, and iii) the vertical distance from the floor up to the underside of the tabletop, which is in turn designated by iv) a PartGroup selected from a "Tabletops" PartGroupClass. These four User selections will determine which specific Leg component is activated, its material and its specific dimensions. Of course, within each of the selected PartGroups, the Administrator has embedded specific Offset dimensions, Node Dominance settings and construction geometry for both the leg and any accompanying parts that are required to build the assembly and fit the Parts together accurately.

Associate Parts with the Matrix

Once the Administrator has created Parts, PartGroup-Classes, and PartGroups on the one hand, and defined a Matrix of Nodes, Contexts and CellGroupAllocations on the other, associations can be created 216 between these sets of entities, thus defining when and where Parts will be included in an Assembly. Such associations are made by creating rules that dictate when Parts and Partgroups appear, and where they are located. Locations are controlled using six different methods. There are five base methods of Partpositioning: Coordinate, Linear, Planar, Spatial, and Parametric Partpositioning. A sixth method, Hybrid Partpositioning, uses combinations of the first five.

Associate a Part to the Matrix Using Coordinate Partpositioning Method

Figure 11:
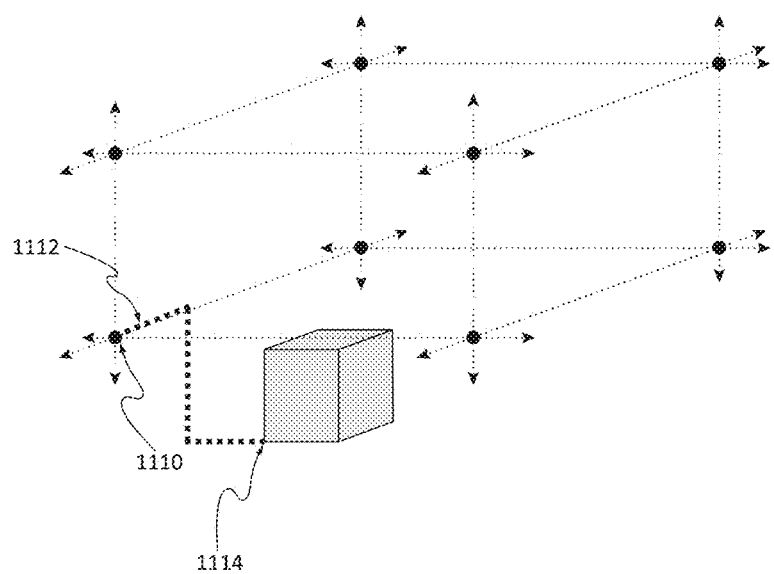
FIG. 11 illustrates Coordinate Partpositioning.

If a Part does not change size, or scales independently from changes to the Matrix, it would typically be positioned using the Coordinate Partpositioning method. Also referring to FIG. 11, this entails associating the Part's Anchor Point 1114 to one Node 1110 on the Matrix, with linear and rotational Offsets 1112 as appropriate. Such Offsets and dimensions of the Part could be altered in relation to conditions separate from the size of the Matrix, such as stylistic selections, or changes in materials. The position of the Part would also change if the position of its related Node was changed.

An example of Coordinate Partpositioning may be the location of a handle on a door. It's location is dependant upon the existence of the door, and it's position may be referenced to the bottom corner of the door, such that it was always a specified vertical distance from the floor, and lateral distance from the edge of the door. Different styles of handles may be available by defining multiple PartGroups in a "Doorhandle" PartGroupClass. Each available handle may have it's position defined independently, to ensure the hardware is the correct distance from the edge of the door. The Administrator may also provide the option for the User to change the height from the floor. The positioning of the handle is independent of the Matrix, other than the single Node which represents the bottom left corner of the space occupied by the door Part.

Associate a Part to the Matrix Using Linear Partpositioning Method

Figure 12:
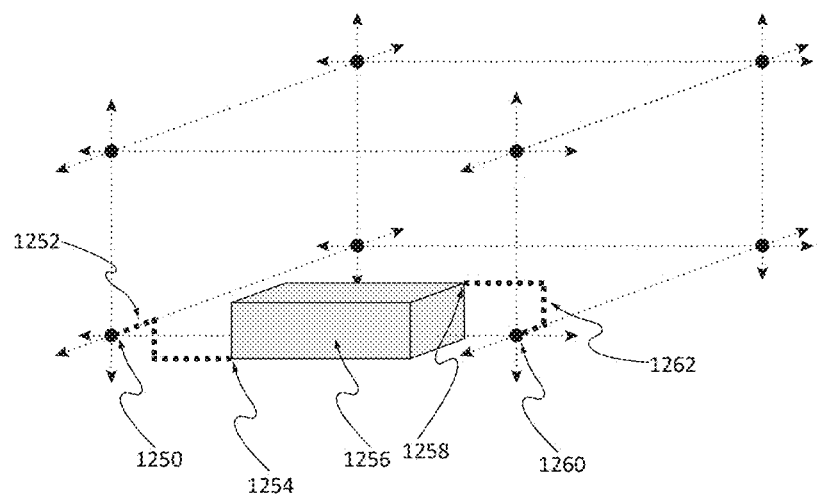
FIG. 12 illustrates Linear Partpositioning

Referring also to FIG. 12, if a Part 1256 is intended to scale in one dimension, it may be positioned using the Linear Partpositioning method. This entails associating the Part's Anchor Points 1254, 1258 to two Nodes on a single Axis, with Offsets 1752, 1762 as appropriate. At such time as the distance between the Nodes 1750, 1760 is altered, the length of the Part would be changed accordingly. In such a case, the two dimensions of the Part that are not controlled by Node positions would be either fixed values or controlled by factors unrelated to the Matrix, as determined by the Administrator.

Some examples where Linear Partpositioning is preferable include gutters mounted along the edge of a roof in a House configurator, legs in a Table configurator, a central post in a Lamp configurator, or the edge trim on a panel in a Cabinet configurator. In all cases, the Parts possess a constant profile shape, changing only in their length dimension. Such a change may be controlled by anchoring the ends of the Part to two Nodes on the same Axis in a Matrix, and giving the User the ability to alter the distance between these Nodes. In each case, there may be the requirement for Offset values to control the exact end point of the Part so that it successfully mates with adjoining Parts. In the case of the Lamp configurator, this may include Parts forming a base at the bottom end, and a lamp fixture at the top end. It is preferable, in such a case, for the Administrator to create PartGroupClasses for Lamp_base, Lamp_post, and Lamp_fixture, with a range of PartGroups in each class for the User to select from. If PartGroups contained Parts of different sizes, the Administrator may specify Offset values as needed. The presence of selected PartGroups in the Lamp_base and Lamp_fixture PartGroupClasses is not required for the Lamp_post to be activated. Such a scenario might be preferable for a configurator that is used to acquire replacement parts.

Associate a Part to the Matrix Using Planar Partpositioning Method

Figure 13:
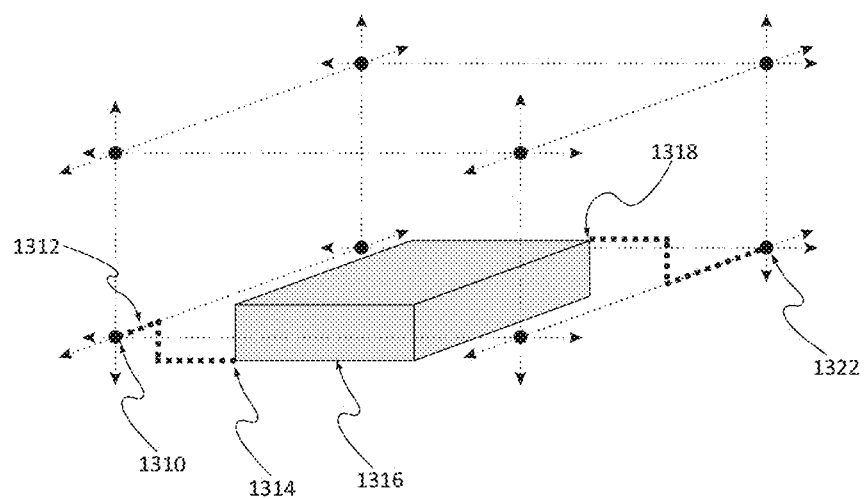
FIG. 13 illustrates Planar Partpositioning

Referring also to FIG. 13, if a Part is intended to scale with the Matrix in two dimensions, it may be positioned using the Planar Partpositioning method. This entails associating the Part 1316 with a defined Context, comprised of four Nodes on the Matrix on a single two dimensional Plane. At such time as the distance between the Nodes 1310, 1322 that are associated with the Part's Anchor Points 1314 1318 is altered, the length and width of the Part would change accordingly. In such a case, the dimension of the Part that is not controlled by Node positions would be either a fixed value or controlled by factors unrelated to the Matrix, as determined by the Administrator.

Some examples where Planar Partpositioning is preferable include a pane of glass in a Window configurator, a tabletop in a Table configurator, a windshield in a Boat configurator, a sole in a Shoe configurator, and a door in a Cabinet configurator. In all cases, the Parts are positioned by relating two Anchor Points to Nodes that vary their locations in two dimensions, but remain constant in a third dimension. It is not necessary that the Context be flat. If the Administrator constructs a non-rectilinear Matrix, it is possible to utilize curvilinear contexts. In such a case, a Part that is referenced to such a Context may follow the surface shape that has been defined, as the relevant Nodes are moved around on that surface. As in the previous example, association to other Parts can be controlled through shared Node references and complementary Offset values.

Associate a Part to the Matrix Using Spatial Partpositioning Method

Figure 14:
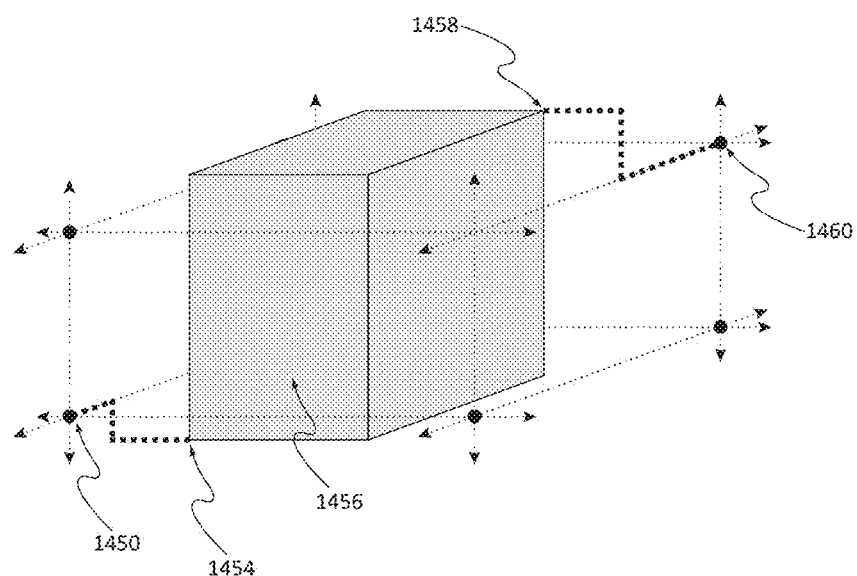
FIG. 14 illustrates Spatial Partpositioning

Referring also to FIG. 14, if a Part is intended to scale in three dimensions, it may be positioned using the Spatial Partpositioning method. This entails associating the Part 1456 with a defined Cell or Cellgroupallocation, typically comprised of eight Nodes on the Matrix to define a three dimensional volume. At such time as the distance between any of the Nodes 1450 1460 associated with the Part's Anchor Points 1454 1458 is altered, the length, width and height of Parts within the Partgroup would change accordingly.

Figure 10A:
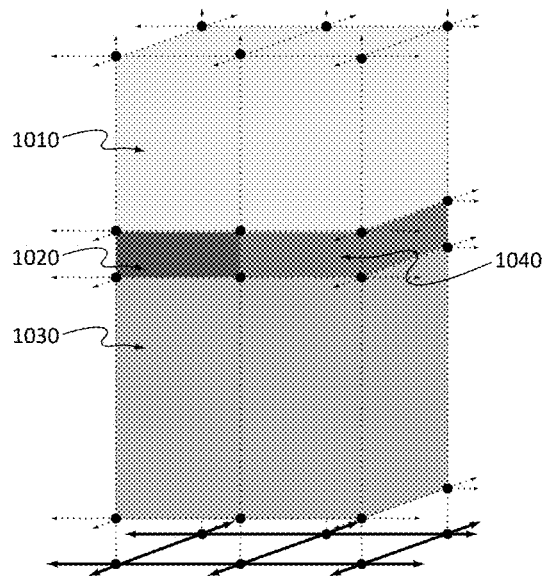
FIGS. 10A and 10B illustrate configuration of CellGroups and association with Parts.
Figure 10B:
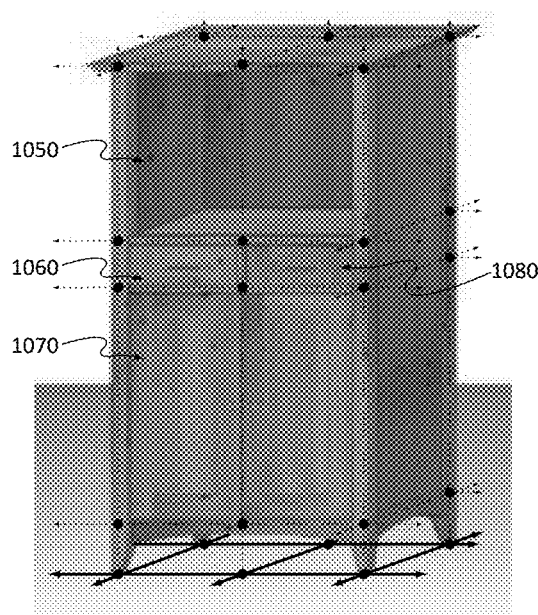

Referring also to FIGS. 10A and 10B, this enables functionality that allows the unskilled User to create a simple Cellgroup, such as 1010, 1020, 1030, and 1040, and invoke one or many associated operations, such as the introduction of Parts in locations and relationships that are appropriate to the overall assembly, and various stylistic settings that might control the selection of particular PartGroups for each PartGroupClass, such as shown in 1050, 1060, 1070, and 1080.

Some examples where Spatial Partpositioning is preferable include a closet space within a House configurator, a loading dock in a Factory configurator, handlebars in a Bicycle configurator, a copper winding in an Electric Motor configurator, and a drawer assembly in a Cabinet configurator. In all cases, the Parts are positioned by relating two Anchor Points to Nodes that vary their locations in three dimensions, affecting the overall volume of space that bounds them. As in the previous examples, association to other Parts can be controlled through shared Node references and complementary Offset values.

Associate a Part Using Parametric Partpositioning.

If the position and size of a Part is entirely dictated by its relationship with another Part, and that relationship is constant, it can be useful to define the location solely through this relationship, independent of the Matrix. While this is most easily accomplished within the described framework by associating the Anchor Points of one Part to the Anchor Points of its related Part, such association is not required. It could also be achieved by defining specific surfaces, edges, or other geometric attributes such as holes, slots, and so on.

One example where parametric partpositioning is preferable is a drawer slide mechanism mounted to the inside face of a cabinet panel. In such a case, if a User opted to insert a Drawer into an Assembly, logic for the cabinet panel may invoke geometry for pilot holes in the appropriate locations, based on the size and position of the drawer Partgroup. Further logic may then stipulate that the mounting holes stamped out of the drawer slide mechanism be positioned concentric to the pilot holes in the panel, thus ensuring correct positioning. The outer face of the slide mechanism would be aligned with the inner face of the cabinet panel, and no further specifications would be required.

Associate a Part Using Hybrid Partpositioning.

It is further possible to define the position of a Part using a combination of some or all of the aforementioned Partpositioning methods. For example, a Part might be positioned in two axes according to the Spatial Partpositioning method, while the third axis is controlled through Coordinate Partpositioning method.

Figure 7A:
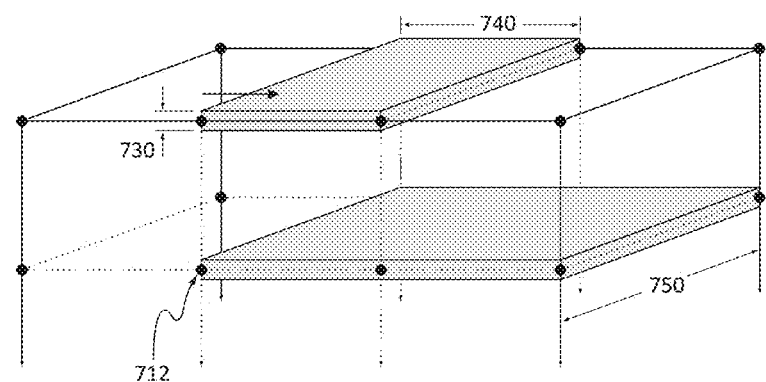
FIGS. 7A and 7B show Part and Multi-Part positioning with dimensional accuracy within a Matrix.
Figure 7B:
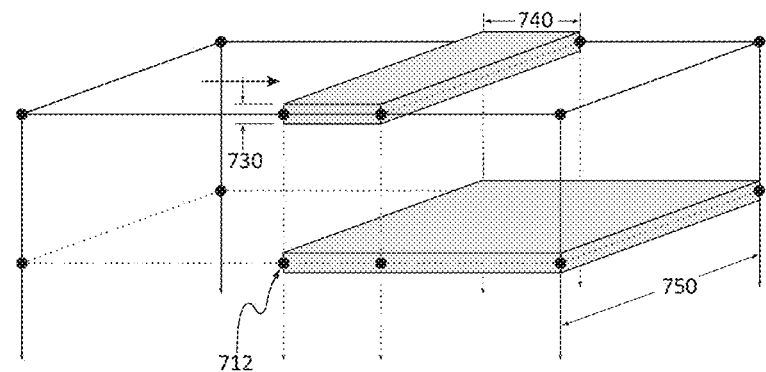

Referring also to FIGS. 7A and 7B, for an example of Hybrid Partpositioning, a panel that is intended to orient laterally on an XZ plane of the matrix may have its "FrontLeftBottom" corner 712 associated with a Node, and its "RearRightTop" corner associated with another Node, such that the overall width 740 and depth 750 of the panel changes as the positions of the Nodes is altered, but the thickness of the panel 730 is modified through a Coordinate Partpositioning control that is associated to the panel material, rather than Matrix dimensions.

Figure 6B:
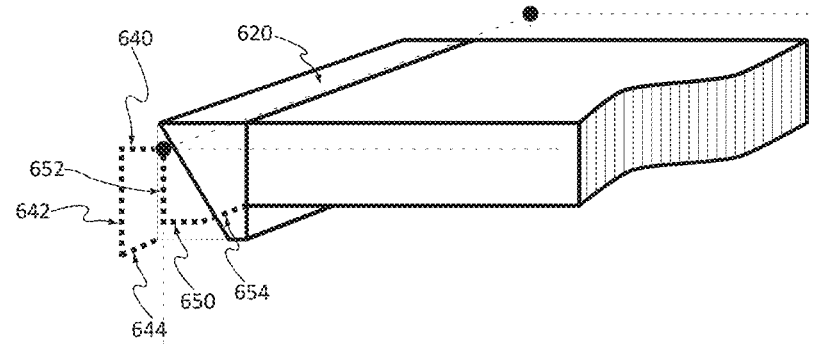

In another example, referring also to FIG. 6B, if a trim Part 620 is associated with the side edge of that panel Part using the Parametric Partpositioning method, the position of the trim Part is calculated to possess offsets from Nodes such that one face aligned with the front edge of the Panel, and varies in length to correspond with variance in the panel Part, as the matrix dimensions are adjusted. The width and thickness will be controlled through Coordinate Partpositioning, and may be either constant values or set by variables independent of the matrix dimensions.

Create Partgroups for Each PartGroupClass

Figure 9A:
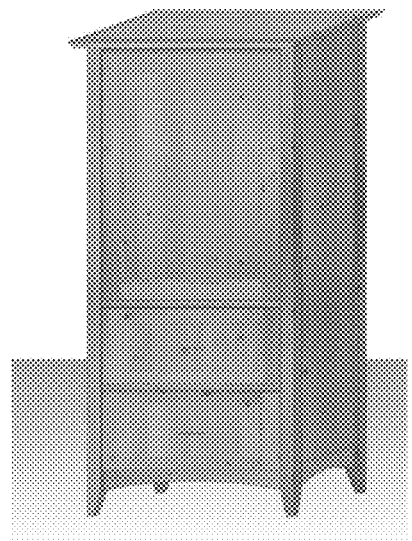
FIGS. 9A, 9B, 9C, and 9D illustrate substitution of different PartGroups.
Figure 9B:
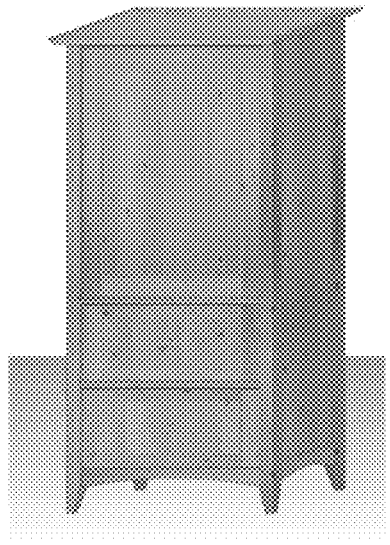
Figure 9C:
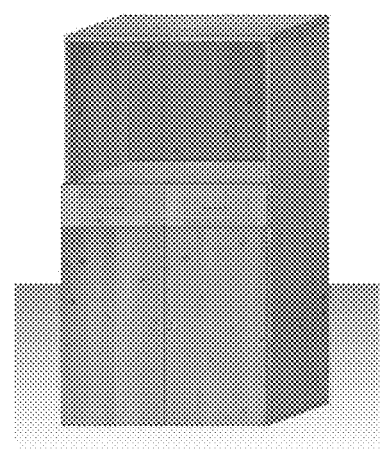
Figure 9D:
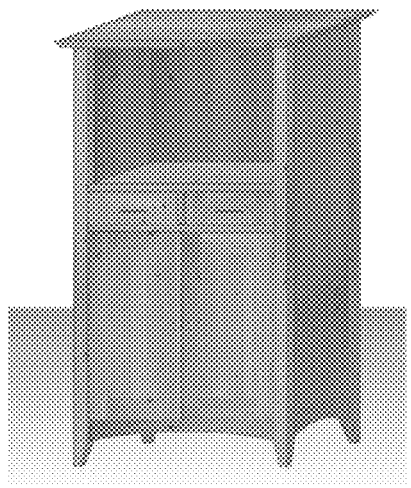

Each PartGroupClass contains at least one, and typically many, PartGroups. The Parts within the PartGroup need not be associated to the Matrix with the same Partpositioning method, in fact this is rarely the case. Parts within the PartGroup also need not be physically attached or even associated with one another. The Parts included in the Partgroup typically satisfy a particular functional or aesthetic goal. Partgroups within the PartGroupClass typically contain Parts with equivalent attributes, such that the substitution of one PartGroup for another in its class will continue to satisfy the same goals, albeit with different characteristics. Also referring to FIGS. 9A & 9B, it is possible to substitute hardware as shown by selection of a different PartGroup. In cases where Parts in a PartGroup do connect with one another, it is necessary to define the required Offset values for the location of each Part such that the elements relate to one another in the desired manner. Also referring to FIGS. 9C & 9D, it is possible to change trim and have that impact joints and dimensions through selection of a different PartGroup.

Set Dimension Max and Min for Different CellGroupAllocations and Other Conditions In any embodiment where the ultimate objective is to build an actual physical product, it is necessary for the Administrator to set 230 size limitations for Parts and Assemblies, to ensure products fall within the limits of structural integrity, strength, and manufacturability.

An Example Using Varied PartGroups within a PartGroupClass

One of the more complex—and useful—manifestations of the capabilities described thus far is in a PartGroupClass for Trim and Panels in a cabinetry configurator. In such a PartGroupClass, panel Parts may be specified for each Context (i.e. Top, Bottom, Mid-Lateral, Outside Gable, Mid-Gable, Adjustable Shelf, etc.). The Parts in each of these contexts may possess complex geometry representing carved embellishments on both their edges and surfaces (e.g. a curved profile carved into the edge of the top panel, a traditional carving of a grape motif on a gable panel). The Parts in such a group may have Offset values that reflect the Node Dominance settings, account for the thickness of each Part, as well as any desired overhang for aesthetic reasons. This example is appropriate for a cabinet made of solid wood components. In another case, using panel material with an engineered core composition (i.e. particle board, medium density fibreboard, plywood), it may be desirable to attach separate "trim" components to finish the exposed edges of each panel. In the simplest case, such trim may be a thin veneer tape with a uniform thickness. In this case, the PartGroup panels may be sized to deduct the thickness of the tape from the total desired panel dimension, so that the resulting assembly has the required overall size.

In a more complex example, some or all edges of the Panels may have trim attached that possesses a greater thickness than the panels. Such construction is similar to what is commonly referred to as "face frame construction" in the cabinetry industry. The Administrator may calculate the Offset values for lateral components that accommodate the greater dimension of adjacent vertical components, and vice versa. For example, the vertical trim Parts attached to gable panels may have Offset values that cause the bottom ends of the trim to extend beyond the Bottom context and the gable panels themselves, thus forming legs.

In another variation, a PartGroup may be defined that does not contain any panels, but rather only a framework of trim components, forming a skeletal framework. Such a Partgroup may rely on joints between the trim elements, rather than any panel attachment, and appropriate offsets at each junction point, accounting for Node Dominance, Part sizes, desired overhang or inset dimensions, etc. Such a panel-less construction is appropriate to many designs, for example that of a table. In all of these examples, Parts in other PartGroupClasses, such as doors, handles, tabletops, and bases are activated and sized as appropriate to fit with the Trim/Panel PartGroup that has been selected.

In an where PartGroups contain elements that serve the same function, but that relate to one another in entirely different ways, are manufactured out of different materials, and/or connected through different means, to the system captures the entire spectrum of product variations within a given product category. An unskilled User may interchange selections in the different part classes while retaining a product's shape and size, or, alternately, to adjust sizing, or add and subtract assembly elements (i.e. drawers, cupboards) while retaining the selected Part combinations, with each Part activating and resizing as necessary.

Create a Configurator UI that Presents the Range of Options to the User, and Provides Feedback in the Form of Visual or Other Data.

Once the elements are in place, it is necessary for the Administrator to create 232 or enable a default computer interface through which the User can access the available tools and options, and receive feedback on any changes that are invoked. Such an interface can come in many forms, but in the preferred embodiment, it provides immediate visual representation of the assembly being customized, and presents the range of options for changing dimensions, stylistic attributes in the form of PartGroupClasses, and the creation, deletion, or rearrangement of Cellgroups.

User Functions for Selecting a Prebuilt Product and Making Modifications

With access to the system, an unskilled User can quickly and easily create a virtually infinite range of products within the solution space defined by the Administrator, making selections for size, style, and product configuration that suit their specific tastes and requirements. However, there can still be a challenge for a User with no experience in this activity to make decisions regarding what they want. For this reason, the preferred embodiment of the system includes a library of pre-existing product configurations that are associated with particular keyword attributes, describing style, functionality, price, and other attributes. The speed and ease with which new product configurations can be created makes it feasible for an Administrator to build such a catalogue very rapidly and at low cost. The publication of product configurations to such a library need not be restricted to the Administrator. Users may share assemblies with each other, and publish them into a library for public sharing.

Use Search Parameters to Find a Set of Products of Interest

Figure 3:
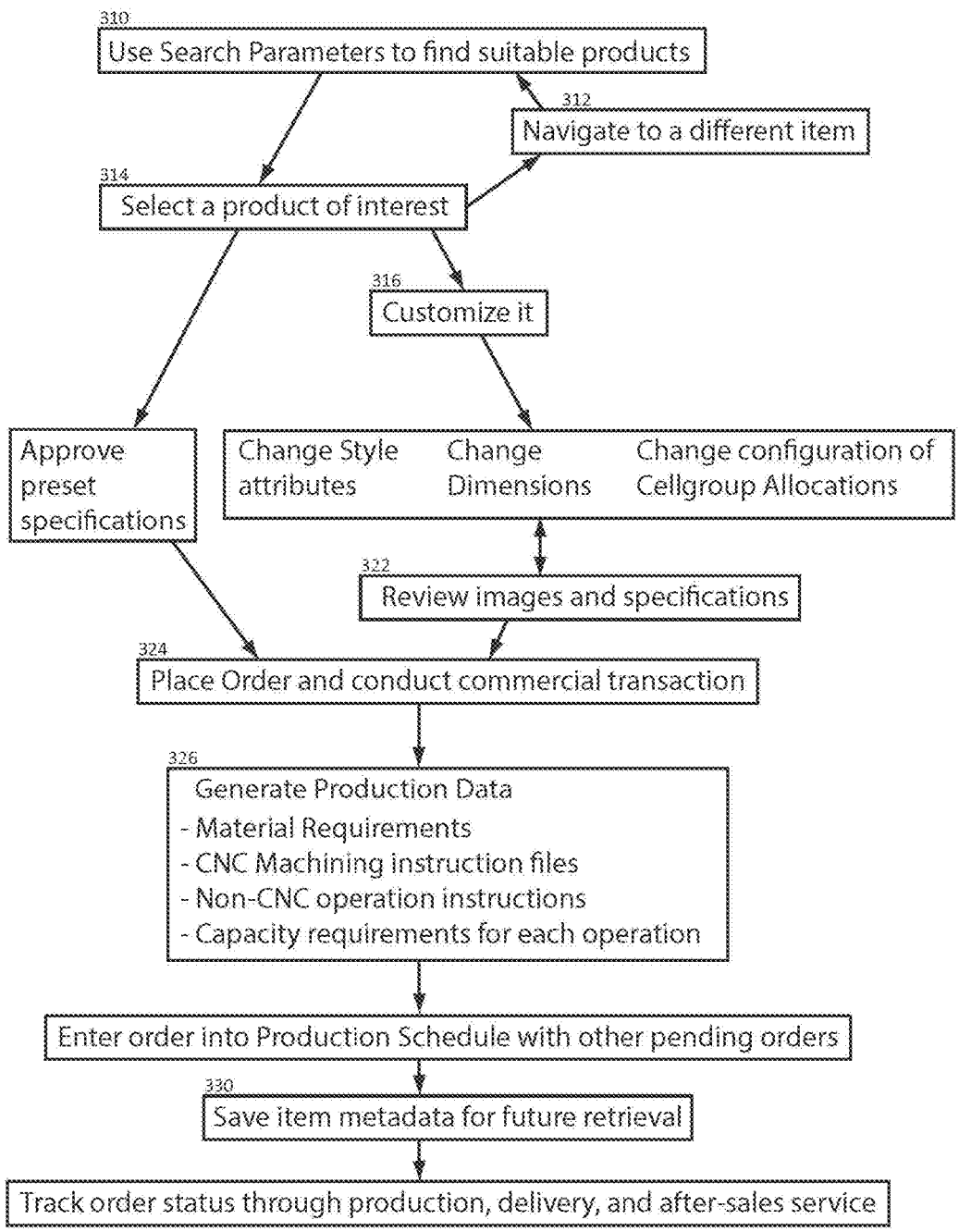
FIG. 3 is a flowchart showing a User process.
Figure 15:
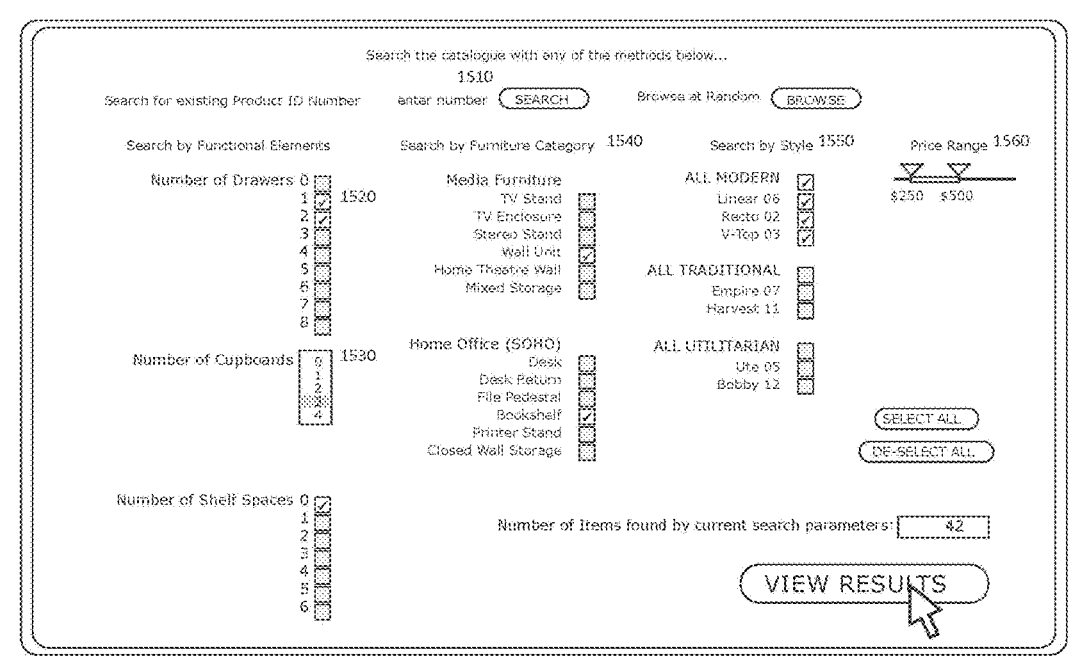

Referring also to FIGS. 3 & 15, using commonly familiar website tools on an interface focused on searching 310 a catalogue of pre-existing items, such as text input 1510, checkboxes 1520, dropdown selection boxes 1530, or images, a User may identify preferences for one or many attributes of an assembly they are interested in. For example, the User might select a product category 1540, such as "Wall units" or "Bookshelves", then further filter on style 1550, such as "All Modern", then specify a price range 1560, such as "$250-$500". Triggering the search then returns an array of results, either in text or image form, that the User may examine. If the library is large, further search tools may be presented to refine the search, and reduce the number of results to be examined.

Select a Product of Interest and Review its Attributes

Figure 16:
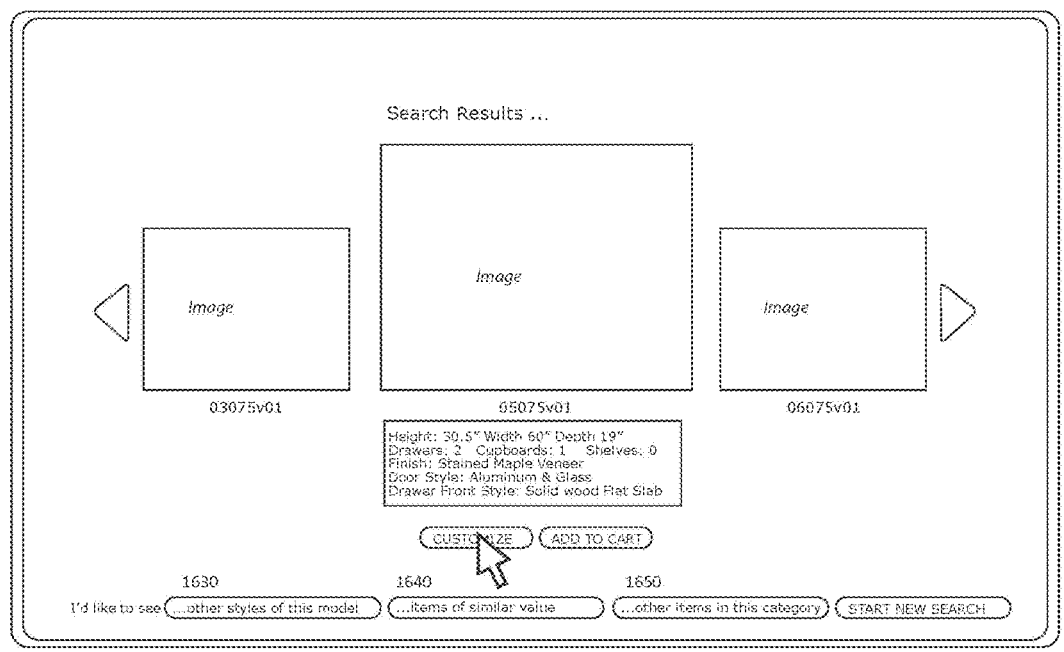
FIG. 16 shows a search results page of an example User Interface.

Referring also to FIG. 16, once one or more search results have been produced the User can examine images and any specifications that are presented to select 314 an item of interest. References to products that are similar in some respect (i.e. style 1630, price level 1640, category 1650), are displayed, with hyperlinks to navigate 312 the User to any item of interest. Selection loads more detailed information, such as further product specifications, pricing, comments and ratings.

Decide Whether to Buy the Item "as is", Navigate to a Different Prebuilt Item, or Use the Configurator to Customize If an item is found in the library that satisfies the User's requirements, it may be ordered 324 "as is". If no item is found that fits requirements sufficiently, the User can further navigate 316 to the Configurator. Alternatively, the Configurator tools may be presented on the same page as the product information, negating the need for another navigational step.

Figure 17:
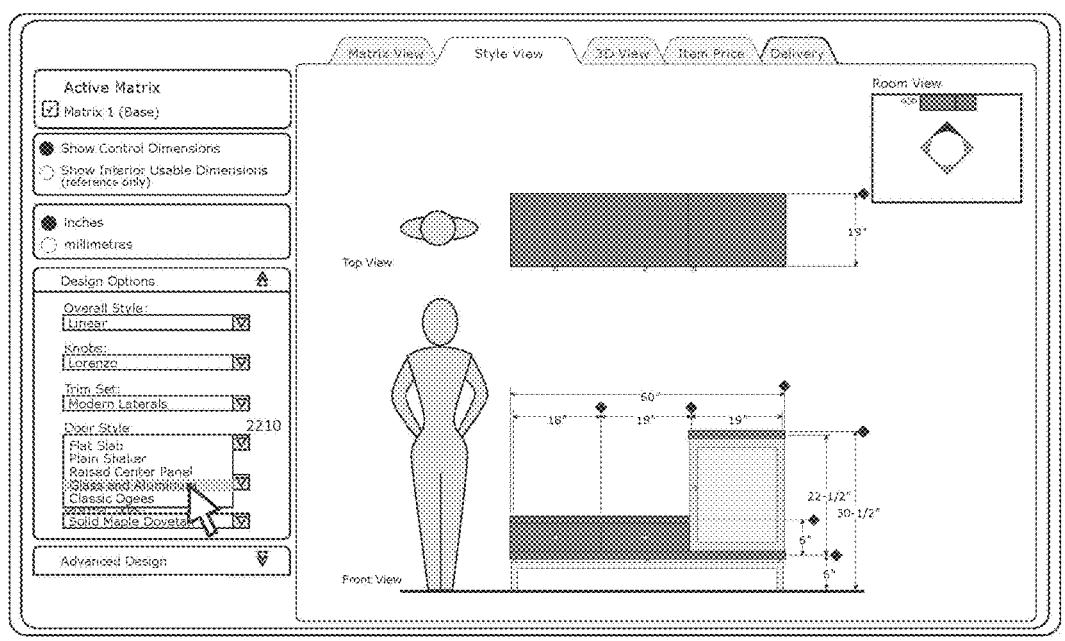
FIG. 17 shows a change PartGroup page of an example User Interface.

Customize Style Options by Selecting Alternate PartGroups in One or More PartGroupClasses Using commonly familiar website tools, such as drop-down selection boxes, checkboxes, text input, and images, a User can make stylistic changes by changing the PartGroup for any available PartGroupClass. Referring also to FIG. 17, for example changing the PartGroup for "faces" 1710 (i.e. cupboard doors and drawer fronts), may trigger the substitution of any faces from flat slabs to framed "shaker" doors, or to glass and aluminum faces. Changing the PartGroup for "Trim" may involve the most structural adjustments, as the size and position of trim elements may affect the way the product needs to be built. Such a PartGroup typically includes panels, which are controlled through Planar Partpositioning, and trim, which is controlled through Linear Partpositioning. In one example, a selected pre-existing assembly may use a "frameless" modern style PartGroup that has either no trim or trim with no discernible dimension; it consists solely of panels. Alternate Trim PartGroups may utilize dimensional trim with shapes commonly associated with the Arts & Crafts design movement, using arched rails and mitred edges around the top surface. This change triggers a myriad of adjustments using the data, rules, and equations encoded by the Administrator, to add/subtract Parts and to alter the positions of Parts relative to Nodes. This example demonstrates how PartGroups of substantially differing composition can be interchanged in a controllable manner, once the initial encoding has been completed.

Change Overall Style

Figure 18:
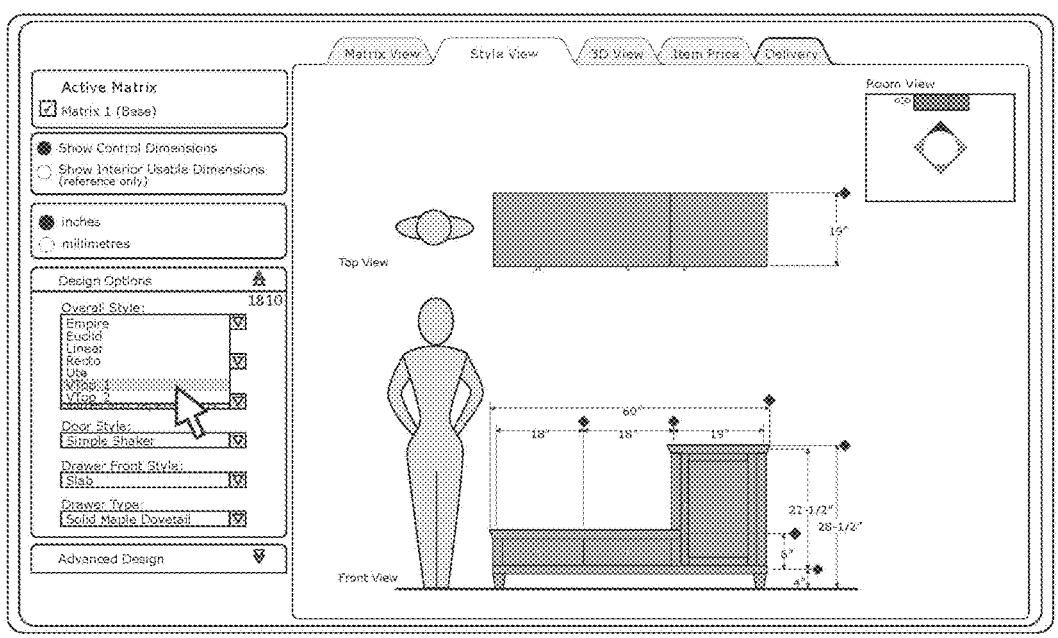
FIG. 18 shows a change PartGroupCombination page of an example User Interface.

Referring also to FIG. 18, In addition to the ability to change the selected PartGroup in a single PartGroupClass, the User may select from different PartGroupCombinations 1810, predefined by the Administrator. This is a way to quickly change the overall look and style of the item, while ensuring that the selected PartGroups are aesthetically complementary. The Administrator may enable Users to create and save their own PartGroupCombinations, for convenient application of desired combinations on multiple items. The Administrator may also provide the ability for Users to share PartGroupCombinations they create, thereby offering a means of user-to-user collaboration.

Change Finish Option for a PartGroup

Figure 19:
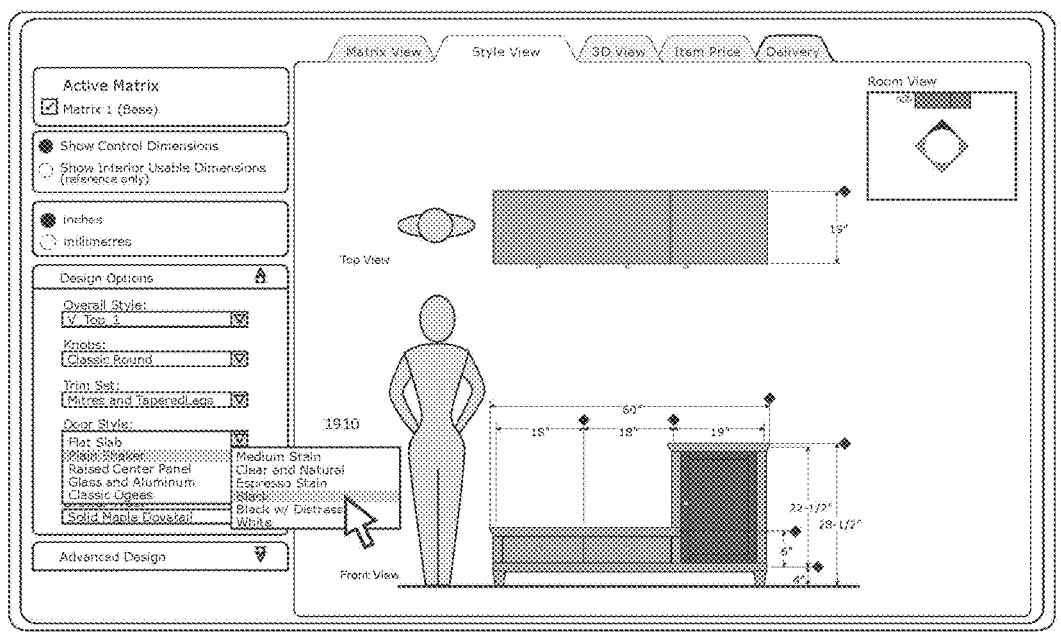
FIG. 19 shows a change FinishMaterial page of an example User Interface.

Each PartGroup available within a PartGroupClass may be available in more than one MaterialFinish. Referring also to FIG. 19, if the Administrator has provided such an option for the selected PartGroup, the User can choose their preferred MaterialFinish 1910. This selection may trigger alterations to the displayed images, cost data, ordering and manufacturing instructions, as appropriate.

Customize Size by Entering Alternate Dimensions

Figure 20:
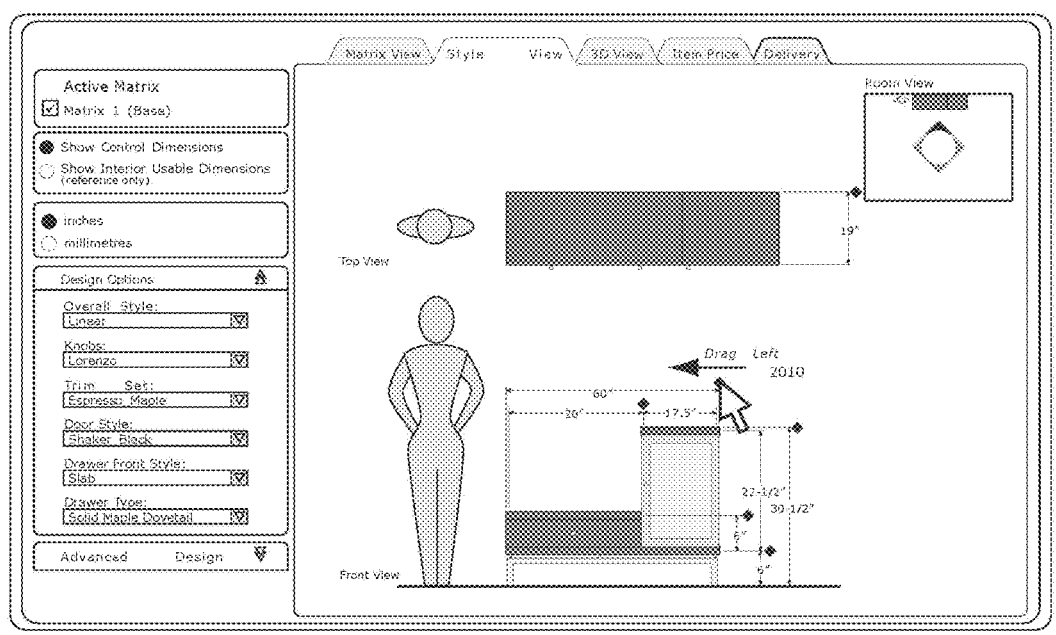
FIG. 20 shows click-and-drag sizing within a page of an example User Interface.
Figure 21A:
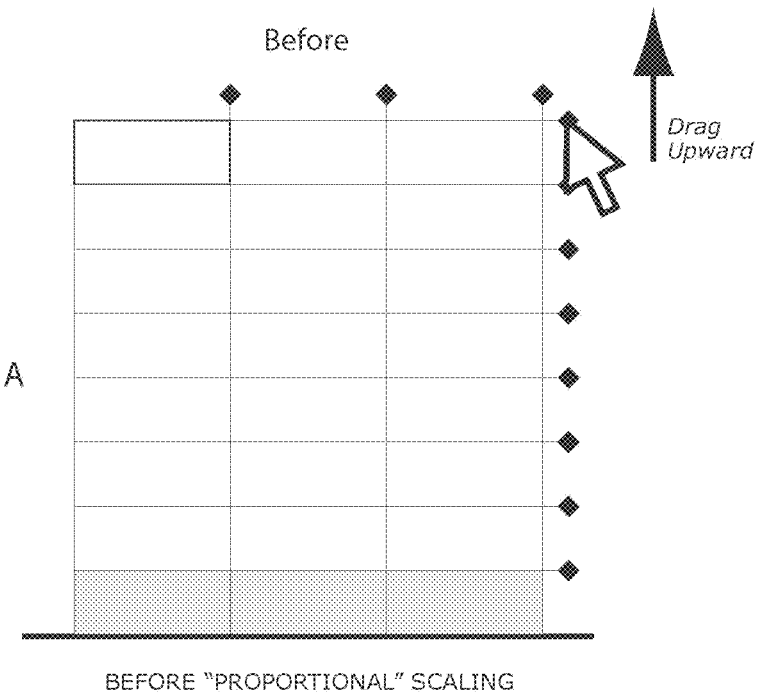
FIGS. 21A and 21B illustrate proportional scaling.
Figure 21B:
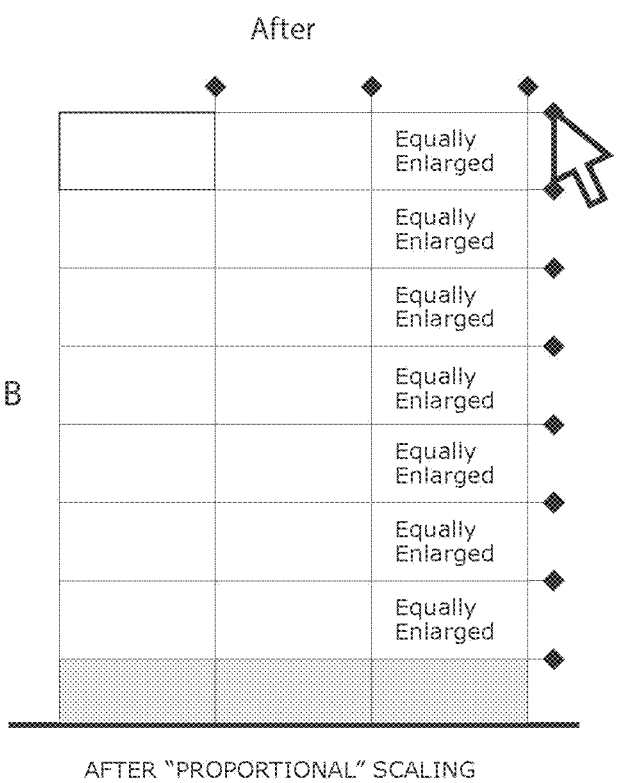
Figure 22A:
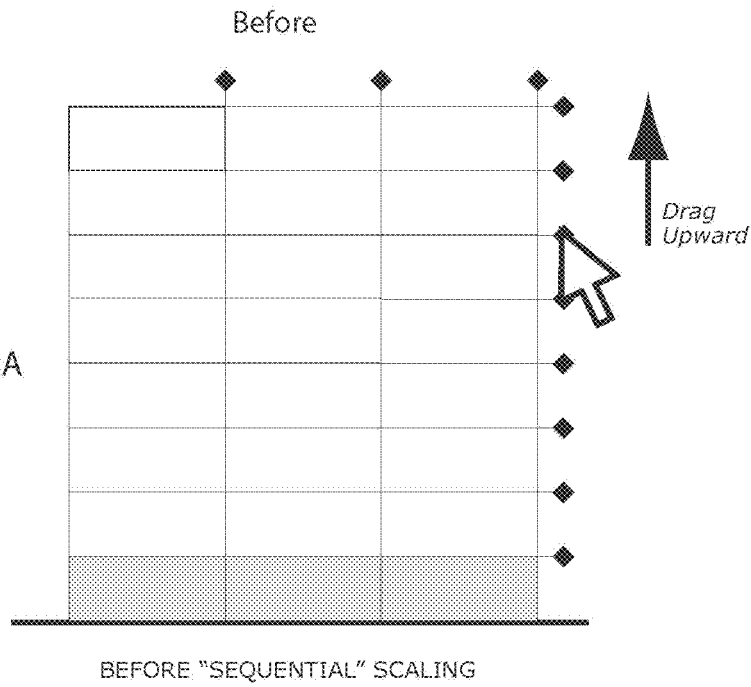
FIGS. 22A and 22B illustrate sequential scaling.
Figure 22B:
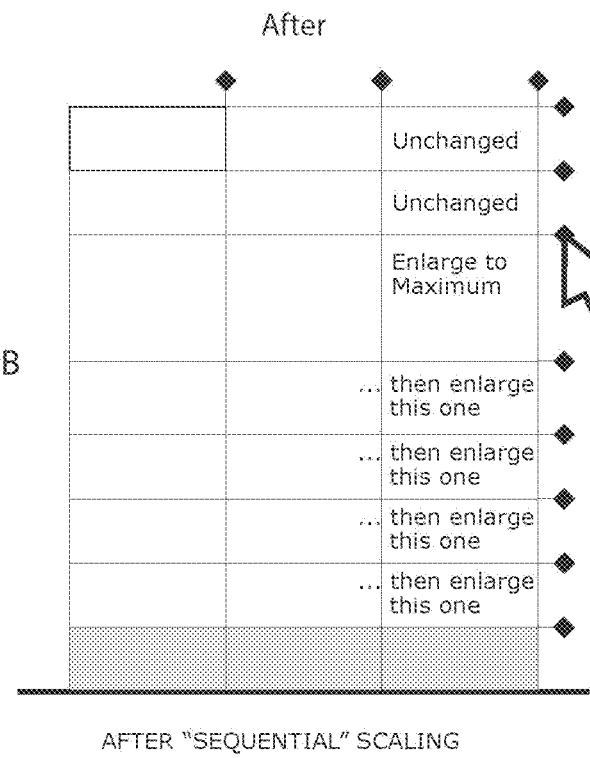

Referring also to FIG. 20, because key positions of all Parts are associated with Nodes, it is possible for the User to adjust the size of the overall assembly, or a subsection of it, either through numerical entry or dynamic interface tool 2010. Such dimensional change is controlled by the size limits encoded by the Administrator, and may be done either before or after changes to the PartGroup selections. Referring also to FIG. 21A, "Proportional Sizing" behaves such that the User click-and-drags an anchor point associated with a Node or axis of Nodes, and the distance between all axes affected by the movement enlarges/decreases proportionally. Referring also to FIG. 21B, "Sequential Sizing" behaves such that the User click-and-drags an anchor point associated with a Node or axis of Nodes, and the adjacent Cellgroup dimension enlarges to its maximum allowable size (or decreases to its minimum), then the next closest Cellgroup enlarges to its maximum size (or decreases to its minimum), and so on, until all affected Cellgroups have reached their maximum (or minimum) dimensions. In the preferred embodiment, Proportional Sizing is utilized when making adjustments to the overall dimension of the complete product defined on the Matrix, and Sequential Sizing is utilized when adjusting the position of an sub-component or Cellgroup.

Alter the Configuration by Switching/Adding/Deleting/Merging/Splitting CeflGroupAllocation(s)

Pre-existing assemblies possess a predefined arrangement of one or more CellGroupAllocations. In the preferred embodiment of a cabinetry Configurator, these allocations might represent drawers, cupboards, open shelf spaces, closet spaces with hanger rails, etc. Using a graphical representation of the assembly, the User may add additional CellGroupAllocations, delete existing ones, or modify the size, shape or relative orientation of existing ones. For example, an assembly might have three drawers stacked one above another, forming a small chest of drawers. The user might delete the bottom drawer, and convert the other two into cupboard spaces, enlarging their dimensions such that the chest of drawers has been converted into an armoire in a matter of seconds. These changes can be done in parallel with the stylistic changes already described, enabling any configuration of CellGroupAllocations to be reproduced with any combination of PartGroups that are encoded to populate said CellGroupAllocations.

In another example, a low TV stand with two drawers and a cupboard might be modified to reduce the total width and eliminate one drawer. This might be achieved through several possible approaches.

Figure 23:
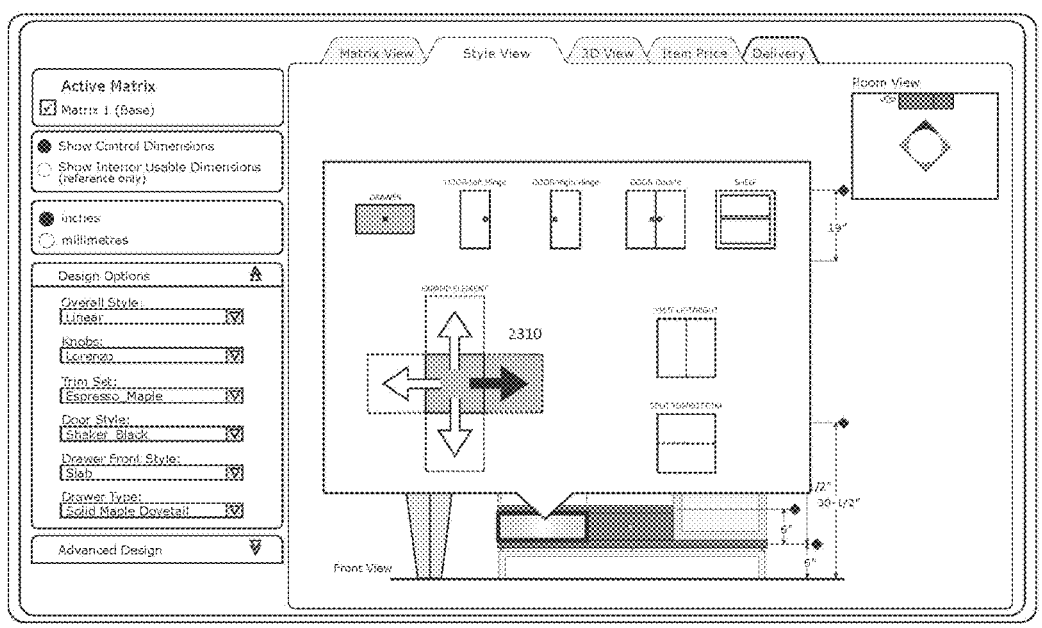
FIG. 23 shows a popup CellGroup Edit window within a page of an example User Interface.

Referring also to FIG. 23, one method of modifying the arrangement of CellGroups is through a menu of tools that appear when an existing Cellgroup is selected. Such a menu may include options to change the CellGroupAllocation, expand the cellgroup in various directions (up, down, left, right, and diagonals) 2310, divide it horizontally or vertically, delete it entirely, or merge it with adjacent cellgroups.

Figure 24:
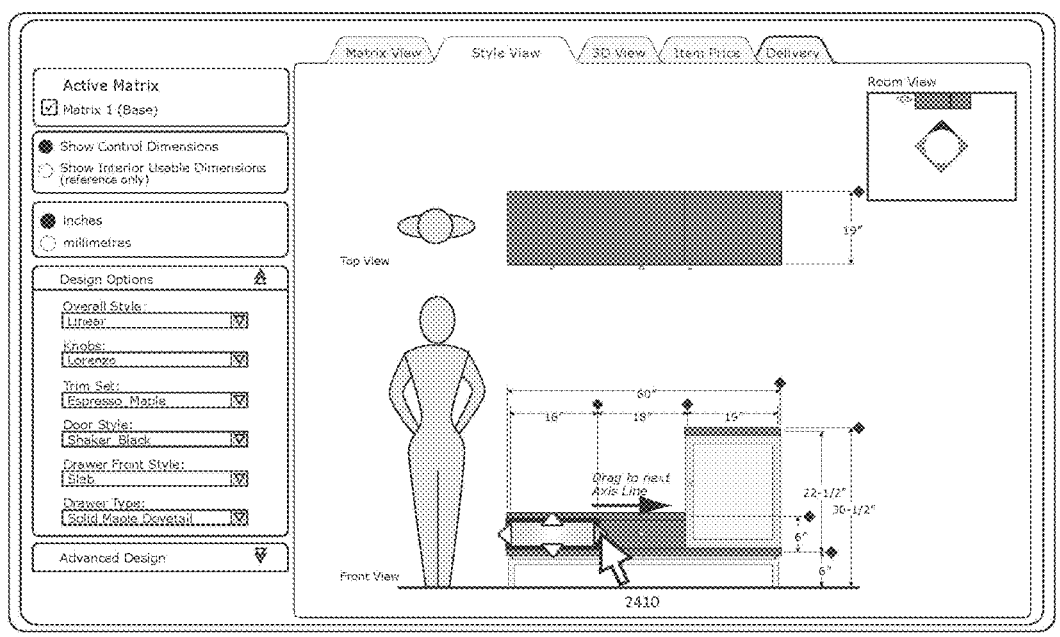
FIG. 24 shows click-and-drag CellGroup Editing within a page of an example User Interface.

Referring also to FIG. 24, another method of modifying the arrangement of Cellgroups is to include graphic tools that allow each boundary of a cellgroup to be click-dragged 2410 to alter the bounding Nodes. If such a click-drag operation starts to overlap an existing CellGroup, rules established by the Administrator allow the new CellGroup to overwrite the existing Cellgroup, or prevent it from encroaching upon an existing CellGroup. If such a click-drag operation overlaps a portion of an existing Cellgroup, rules established by the Administrator govern whether this was allowed, and if so, how to allocate the remaining portion of the existing Cellgroup.

Figure 25A:
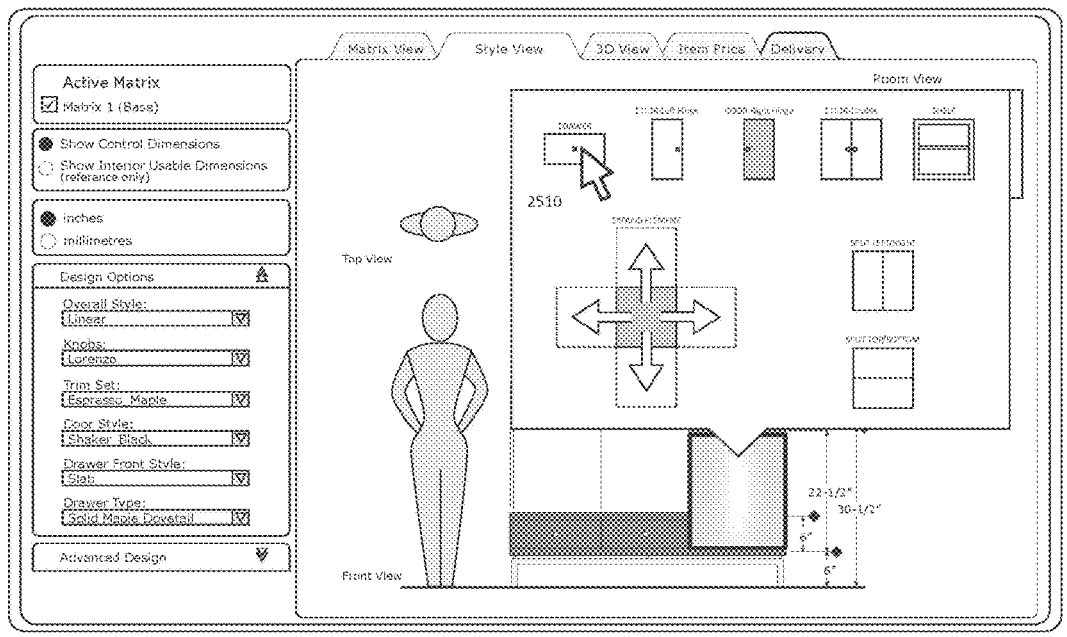
FIGS. 25A and 25B show before-and-after CellGroup allocation within a page of an example User Interface.
Figure 25B:
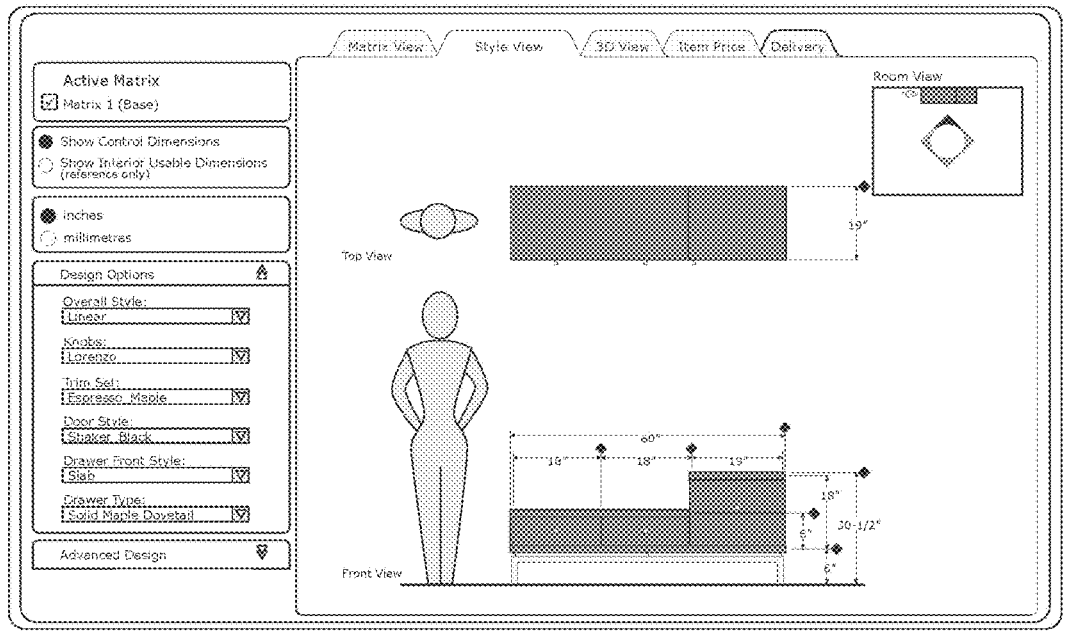

Referring also to FIGS. 25A and 25B, another capability allows the User to change the CellGroupAllocation of an existing CellGroup. A preferred method is by clicking on a Cellgroup to select it, then choosing from a menu 2510 of CellGroupAllocation types to reassign its allocation. If the Administrator has established maximum and minimum dimensions for various CellGroupAllocation types, and if the Cellgroup dimensions fall outside the limits of the new CellGroupAllocation, then changing the CellGroupAllocation also triggers an automatic size adjustment to bring the CellGroup within the established boundaries.

Review Image, Price, Shipping and Delivery, Etc.

Figure 26:
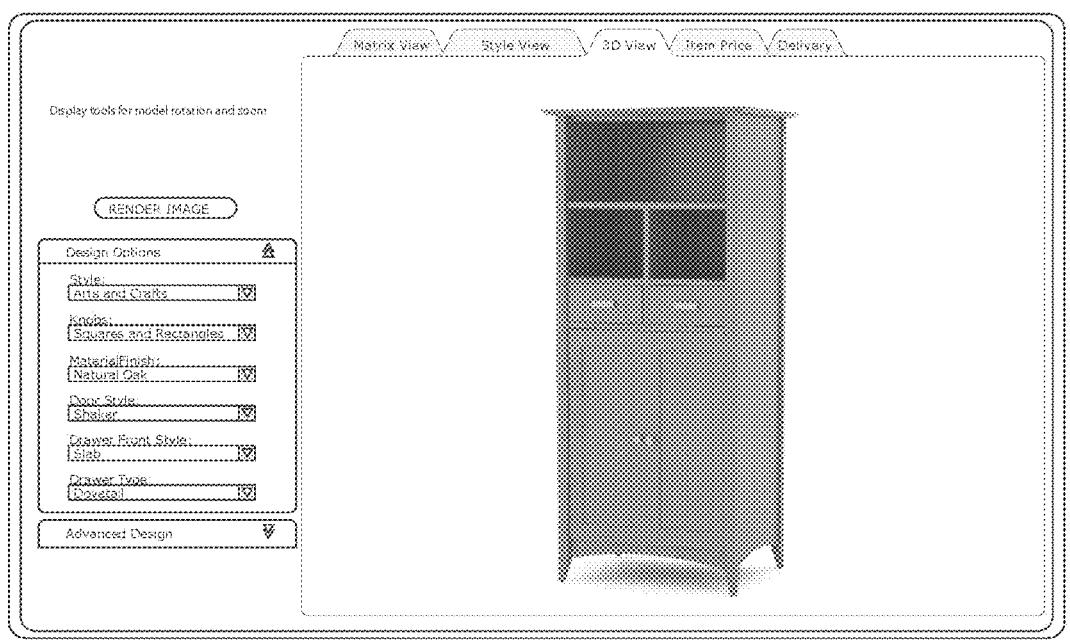
FIG. 26 shows a three-dimensional rendering within a page of an example User Interface.

Referring also to FIG. 26, while the User is making modifications to the assembly, it is possible to provide feedback in several forms. Most importantly, generating and presenting a visual representation of the assembly is important, to provide a means for the User to review 322 the results of their changes, and decide whether to modify further or if they are satisfied. Ideally, such a representation is as realistic as technically feasible, and current technology makes it possible to generate images that are virtually indistinguishable from photographs of real objects. Such images are generated in real time, either by a powerful computer processor on a server, or using whatever processing capability the User has on their own computer hardware.

Figure 27:
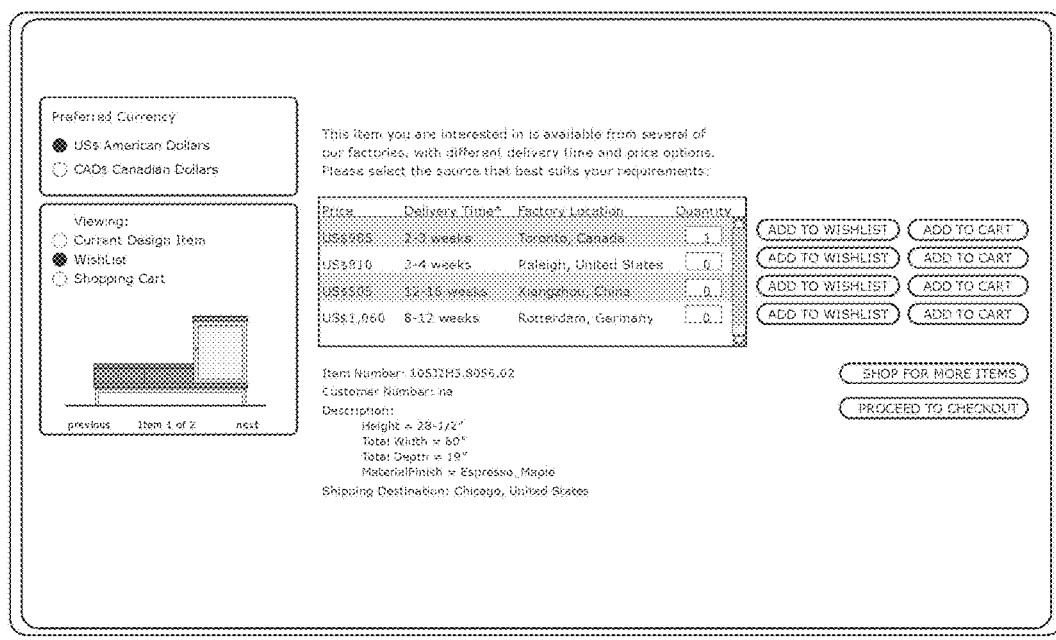
FIG. 27 shows a price options page of an example User Interface.

Referring also to FIG. 27, in addition to images it is both possible and desirable to present information related to the price of the configured assembly. This is feasible if the Administrator has encoded sufficient information pertaining to the costs of materials, labour, overheads, and desired profit margins for a cost-based pricing structure, or devised a market-based pricing structure that would apply to size ranges and stylistic options.

Figure 28:
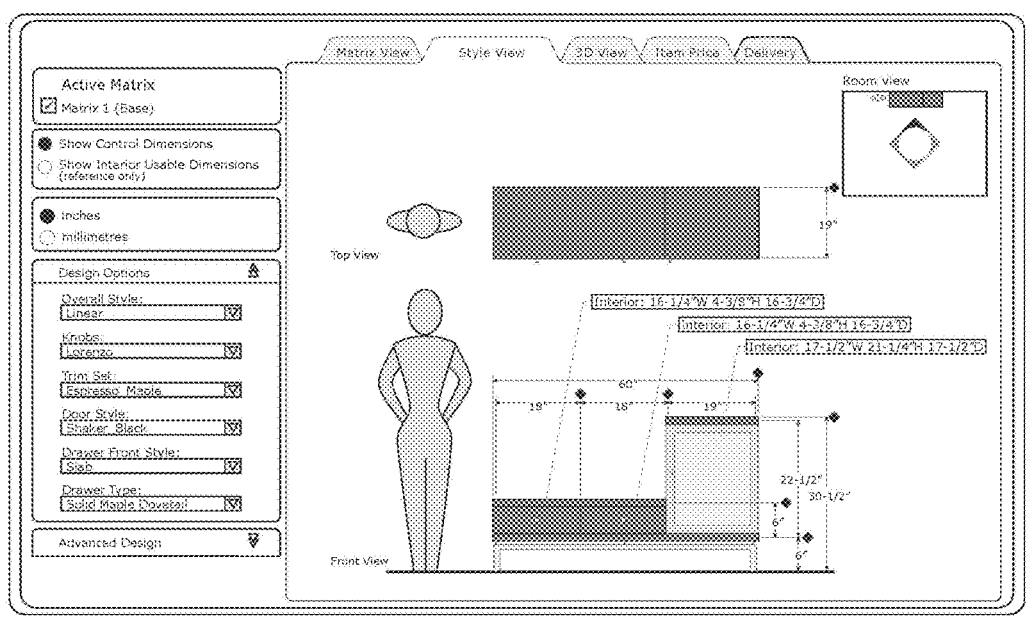
FIG. 28 illustrates internal dimensions within a page of an example User Interface.
Figure 29:
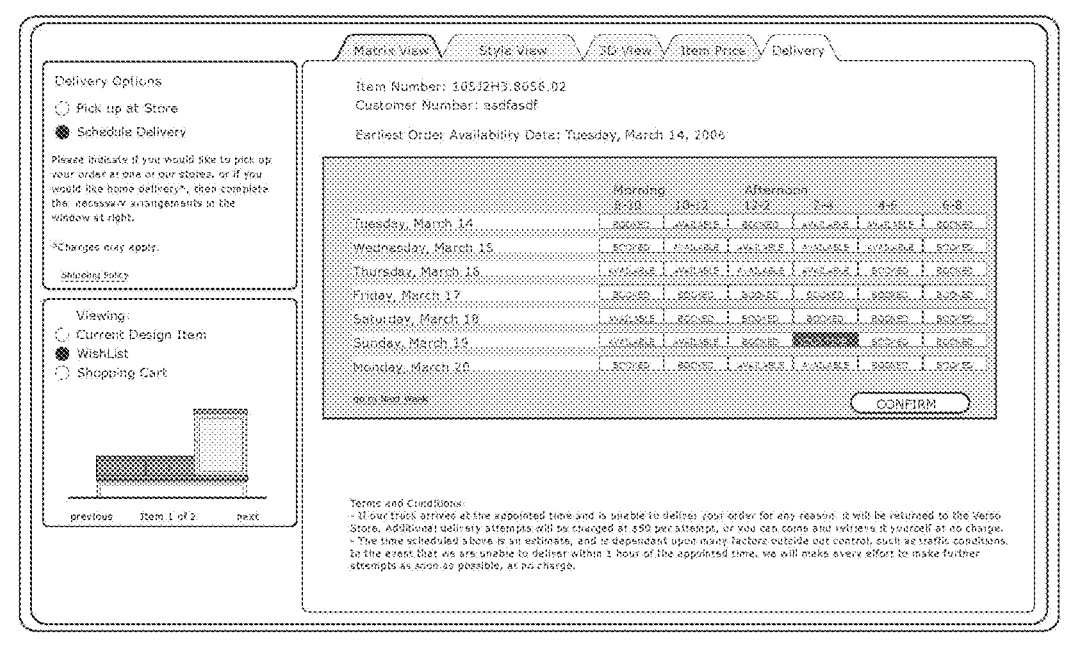
Figure 30:
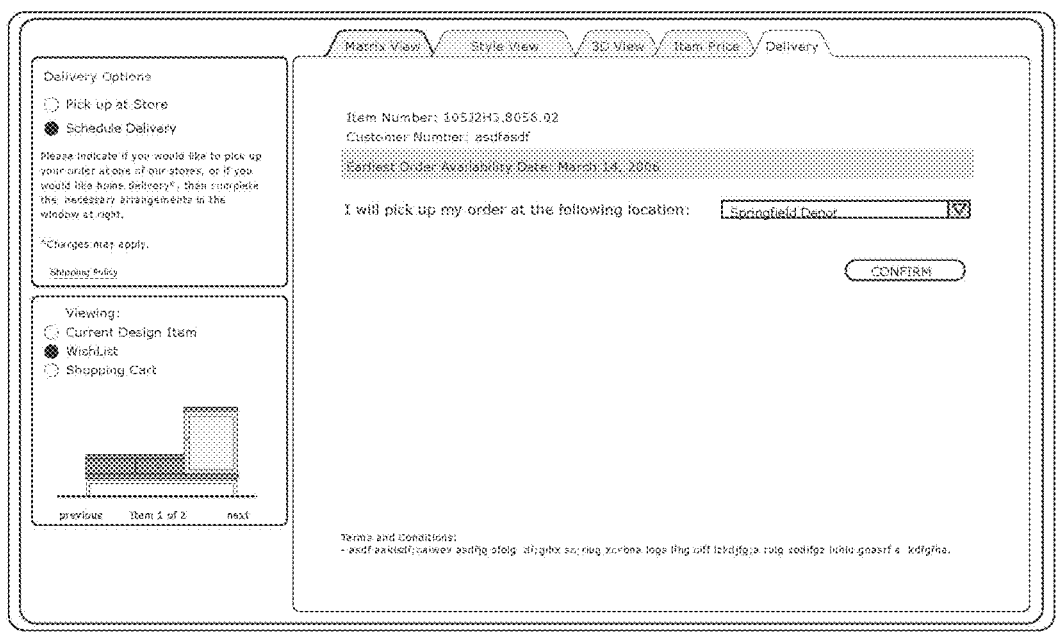
FIG. 30 shows a pickup locations page of an example User Interface.

Referring also to FIGS. 28, 29, and 30, other forms of data that are useful and possible to present to the User include the overall size and weight, internal clearances for cupboards, drawers, and shelf spaces, cost for shipping, scheduling of delivery, locations where the product might be made or available for pickup, etc.

Fulfill a Commercial Transaction

Once the User has settled on an assembly that is desirable, and is comfortable with associated price, delivery time, and so on, the order can be placed 324 using familiar eCommerce methods and procedures. Such a process requires the generation and tracking of a unique identifier for the assembly and the User, as each item may be unique, not just pulled from an inventory of identical items.

Generate Production Data

Once an order for a particular assembly has been placed, regardless of whether it is identical to a pre-existing library assembly or is in some way customized, it must be manufactured. With sufficient encoding of data, rules, and equations by the Administrator, the system generates 326 a range of instructions to facilitate production, including computer files to control CNC production machinery, cut lists for manual operations, schedules to optimize the sequence and flow of work through a factory, purchase orders for materials and items sourced from other suppliers, documentation for packaging and shipping, and so on. This set of capabilities is commonly referred to as "Enterprise Resource Planning".

Alternately, with appropriate preparation by the Administrator, the system may generate information that would integrate with any existing ERP system, using a compatible data format such as "XML".

Save Customized Item for Future Retrieval

At any time, the User is able to save 330 any assembly they have customized for future retrieval and development. This can be done by saving the set of user input values for dimensions and PartGroup selections, as well as the configuration of CellGroupAllocations on the Matrix. This small set of data can be retrieved at any time and reprocessed through the system to regenerate the much larger dataset that is utilized in the modification and subsequent manufacturing steps.

Other Embodiments

Use Search Parameters to Find a Product Configuration that is Devoid of Stylistic Attributes (i.e. a Stick Drawing of a Chest with Three Drawers)

In this embodiment, rather than selecting a "complete" assembly with all stylistic attributes already assigned and displayed, the User selects an "assembly template"—a simplified representation of a product configuration (i.e. a stick drawing) that represents the basic configuration and proportions, but is devoid of stylistic attributes. This enables the User to focus on the product's function and not be distracted or biased by style. It also enables the User to design an assembly from scratch, providing an enhanced sense of accomplishment and control.

Go Through Each PartGroupClass in Turn, Selecting the Desired PartGroup. See an Update in the Displayed Information as Each Selection is Made.

Once an assembly configuration is selected, it loads into the Configurator. There, the User is prompted with graphical and text cues to select PartGroups for all required PartGroupClasses. In the cabinetry Configurator, the User selects a Hardware PartGroup, Trim PartGroup, a DoorStyle PartGroup, and designations for any other PartGroupClasses defined by the Administrator for the system. If the system is populated with multiple Finish options for any PartGroup, these options are also presented. As each selection is made, the associated graphics appear on the Configurator image, enabling the User to see the effect of their selections.

At any Time in the Process, Adjust Dimensions as Desired.

As the stylistic selections support changes to dimensions, and vice versa, the User may make adjustments to the overall size and the size of any CellGroup at any time during the process. Sizes may be adjusted before any PartGroups are assigned, after some of them are assigned, after they are all assigned, and before or after PartGroups are re-assigned, should the User change their mind or want to see the product with an alternate selection. This flexibility is enabled by the underlying structure of the Matrix and management of Parts through Node positioning.

User Functions for Creating with the Shape Tool

Figure 31:
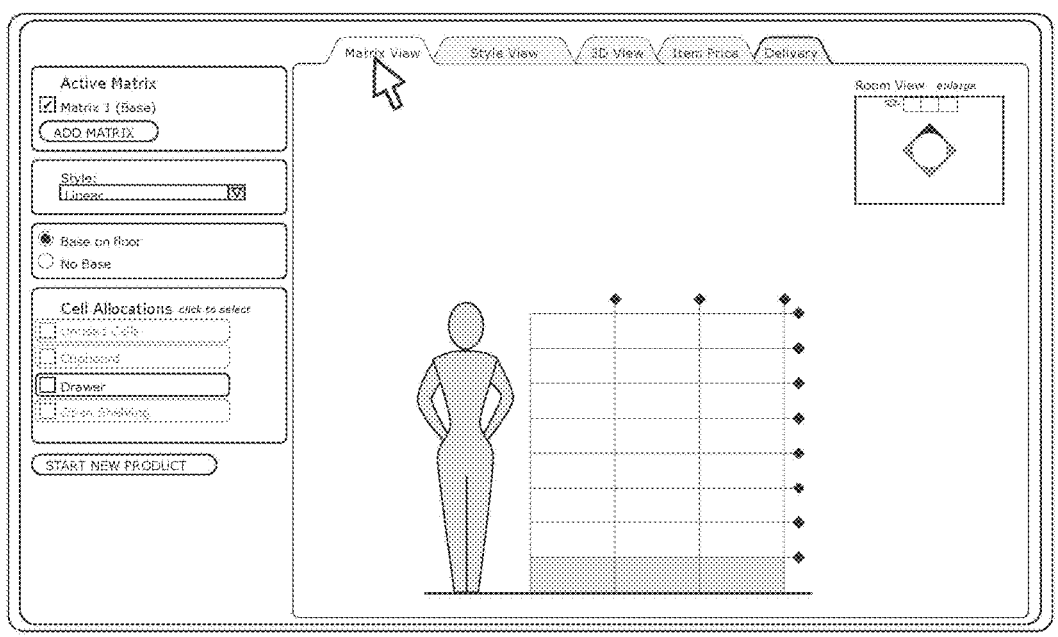
FIG. 31 shows a blank matrix within a page of an example User Interface.

In the preferred embodiment, the Matrix grid is not visible to the User. The Matrix could generate visual clutter. However, in another embodiment the Matrix is displayed, or a visual representation of it that does not necessarily occupy the precise same axis locations. In this embodiment, the User would not select a pre-existing assembly or a pre-existing assembly template, but rather create a new assembly from scratch by generating one or more CellGroupAllocations on a blank grid as shown in FIG. 31.

Figure 32:
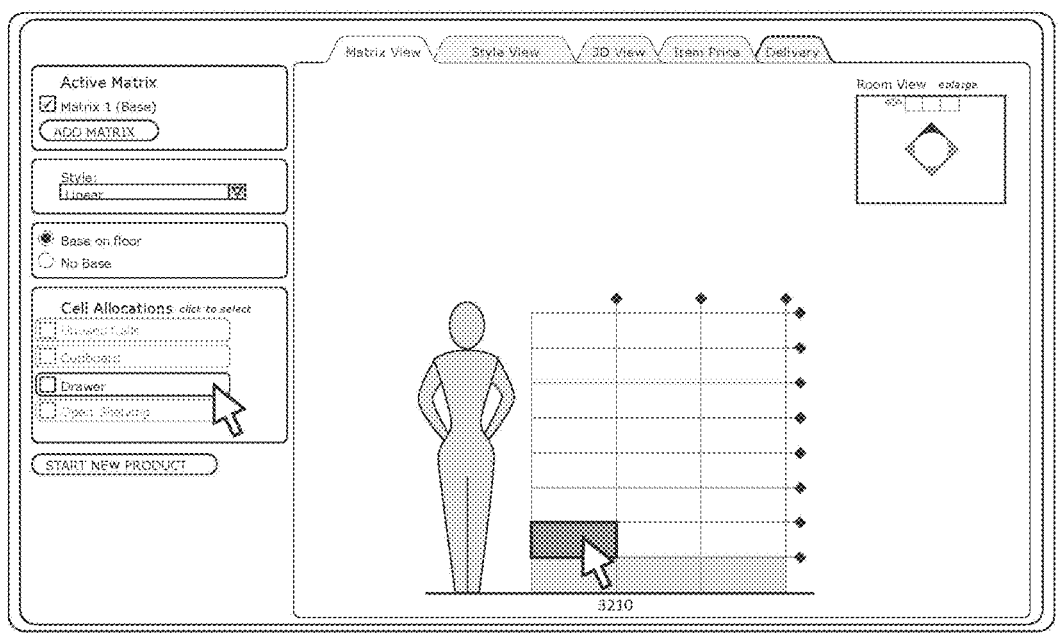
FIG. 32 illustrates creating a first CellGroup within a page of an example User Interface.
Figure 33:
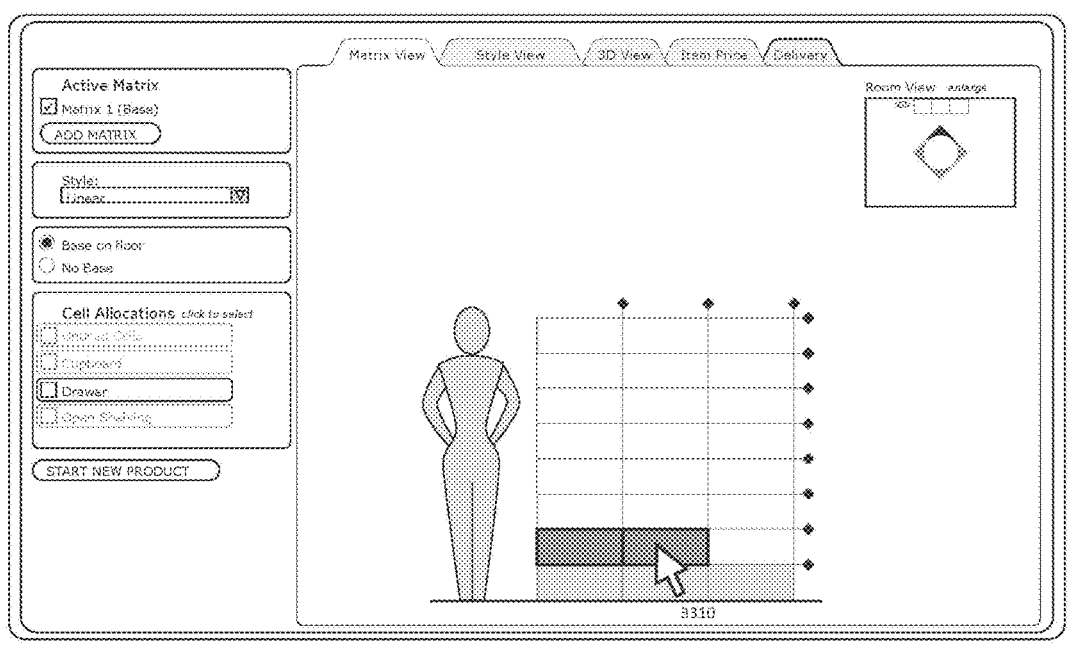
FIG. 33 illustrates adding a CellGroup within a page of an example User Interface.

Starting with a Blank Matrix, Highlight Cells or Cellgroups to Create CellGroupAllocations Referring also to FIG. 32, in the Configurator interface, with no prior interaction with an assembly library, the User can select or highlight one or more cells 3210 using a computer mouse or equivalent interface. Referring also to FIG. 33, once selected, the User can select from a list of the available CellGroupAllocations, and apply the selection to the highlighted cell or cells 3310. Alternately, the User could preselect a CellGroupAllocation, then every time a cell or cells is highlighted, that Allocation is assigned, until they changed to default Allocation.

Alter the Configuration by Adding/Deleting/Merging/Splitting CellGroups

Figure 34:
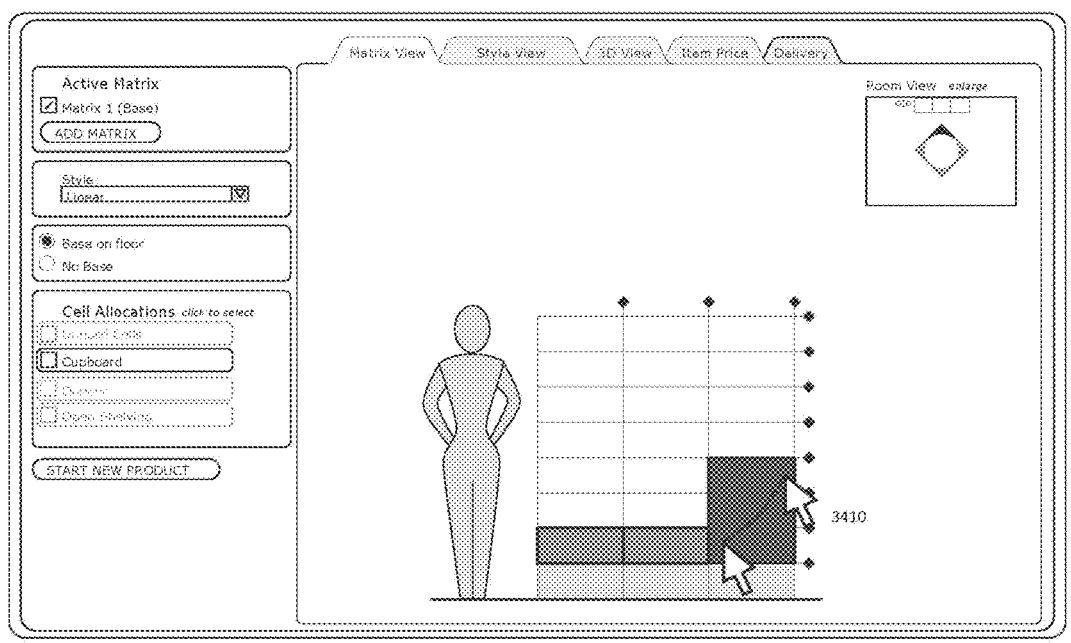
FIG. 34 illustrates creating a multi-cell CellGroup within a page of an example User Interface.
Figure 35:
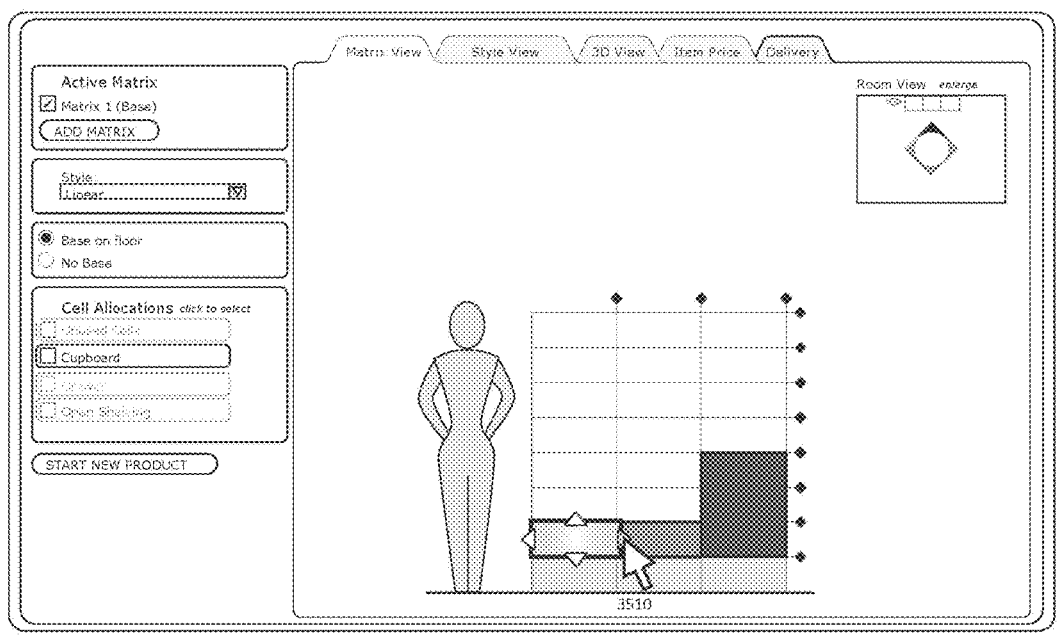
FIG. 35 illustrates modifying a CellGroup within a page of an example User Interface.

Referring also to FIGS. 34 and 35, the User can add additional CellGroups by clicking or click-dragging for multi-cell Cellgroups 3410, or modify a Cellgroup by dragging one of its boundaries 3510 to an adjacent grid axis line (making the CellGroup either larger or smaller). If such a modification involves overlaying an existing CellGroup, the new designation takes precedence over affected cells.

If PartGroups have not been Allocated

Figure 36:
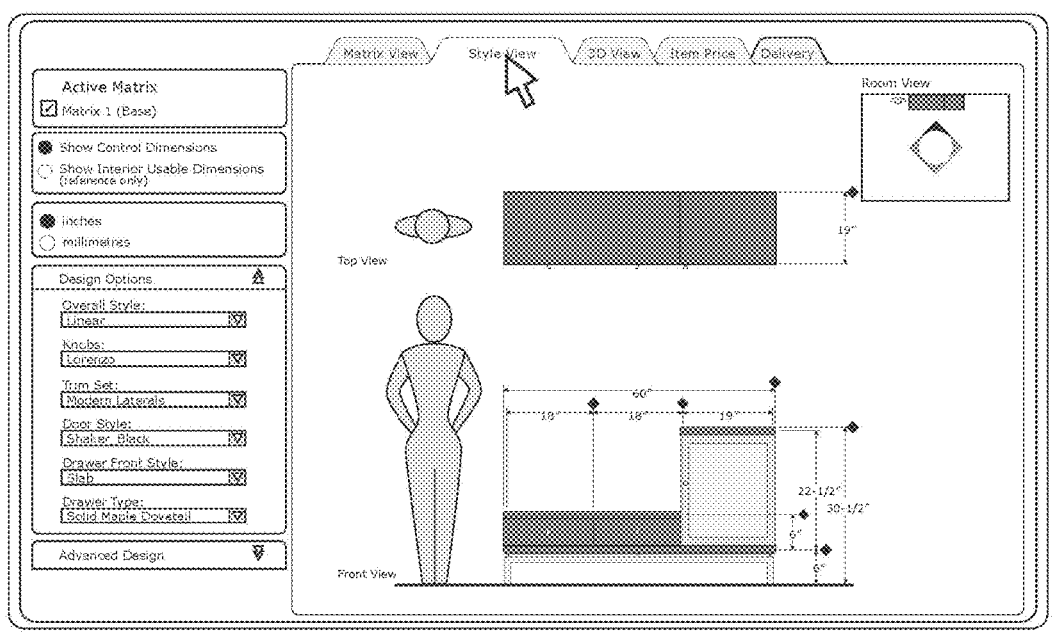
FIG. 36 illustrates applying a style within a page of an example User Interface.

If this process is undertaken without default PartGroup selections set, the ensuing graphic may be a "stick drawing". An Overall Style could then be applied in one step as shown in FIG. 36, or individual PartGroups may be assigned.

If PartGroups were Pre-Selected

If default PartGroups have been established, each time an alteration is made to the configuration of CellGroups the active PartGroups are refreshed to reflect the changes, as determined by the data, rules and equations established by the Administrator.

MultiMatrix

Figure 37:
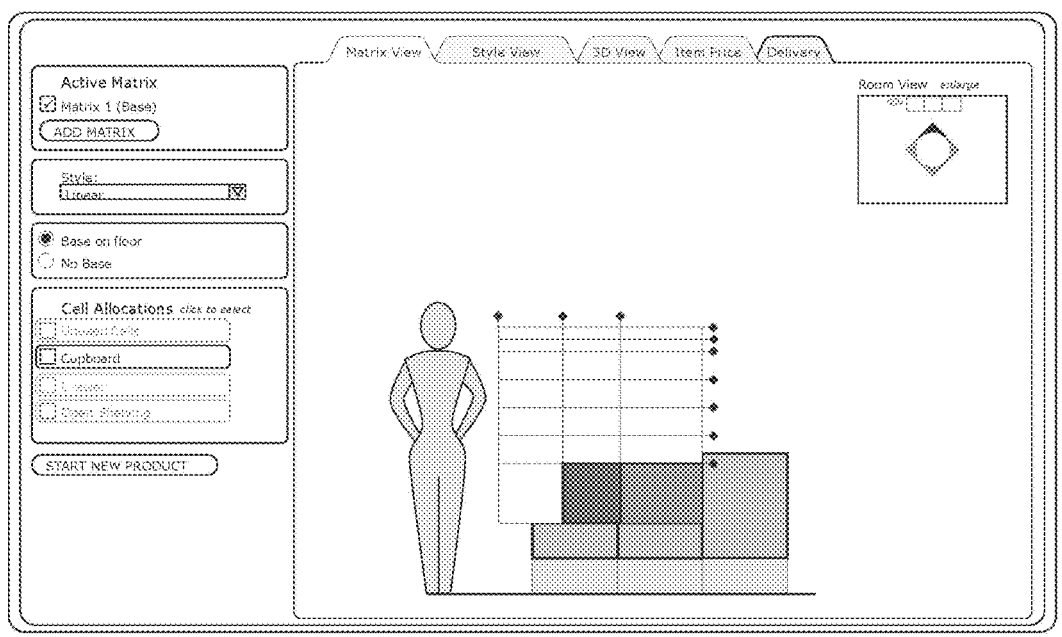
FIG. 37 illustrates use of multiple matrices within a page of an example User Interface.

Another embodiment, that can be added to any of the previous embodiments, is the MultiMatrix. The User triggers the creation of a new Matrix grid, either pre-populated with an assembly of Parts or empty, but with a defined range of Cells, and positions it relative to any existing matrices. This positioning would be achieved by "click-dragging" a graphic representation of the new Matrix onto a graphic representing the existing Matrix or Matrices, until axis lines from the two entities "snapped" into alignment as shown in FIG. 37. From this point on, the User uses a menu tool to select which Matrix was "active" and enabled for editing, with the ability to toggle between all Matrices in the setting.

No Matrix

Alternative to using a Matrix and Nodes, with Parts defined by Nodes and offsets, Parts may be defined based purely on offsets from an anchor point. Within a configurator interface, an origin point may be established such as "bottom left", any other corner, or any other position fixed relative to a complete assembly, and as parts are added and changed their offsets are collectively evaluated to determine positioning relative to the origin. For example, a first part would be inserted adjacent to the origin point. An additional part, positioned on any side of the first part away from the origin, would be based on the first part's offsets and sizing relative to the origin to determine the relative anchor point from which the additional part is based.

Alternative to using an origin, Parts may be defined with offsets relative to adjacent parts. After an initial part is defined in a configurator, additional parts may be added as attached to a side of the initial part, or as attached to parts which, directly or indirectly, attach to a side of the initial part.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A system for creating product configurators, the system comprising a computer device with a processor operating software to:
   provide an administrator interface to an administrator for configuring:
   a matrix;
   one or more materials;
   one or more parts, each part having one or more of the materials and one or more anchor points;
   one or more cell groups, each cell group having one or more parts collectively for a specific function; and
   enable a user interface to a user for non-sequential configuring products within the matrix through selection, combination, and modification of one or more cell groups.

2. The system of claim 1, wherein the matrix is an infinitely expandable three dimensional configuration of nodes.

3. The system of claim 2, wherein multiple matrices are configured for the same configurator, thereby allowing product configuration having different parts aligned in in different orientations.

4. The system of claim 2, wherein each cell group is bounded either by four nodes defining a two-dimensional region, or eight nodes defining a three-dimensional region.

5. The system of claim 2, wherein each material is configured with fixed and/or variable dimensions, with minimum and maximum limits on any variable dimensions.

6. The system of claim 5, wherein each material is configured with cost and weight factors.

7. The system of claim 6, wherein each material is configured with supply source information.

8. The system of claim 7, wherein each material is configured with one or more material finishes.

9. The system of claim 2, wherein each part is configured with one or more anchor points, each anchor point associated with a node of the Matrix.

10. The system of claim 9, wherein the association between anchor points and nodes is based on offset values or relative absolutes.

11. The system of claim 9, wherein parts are associated to the matrix using one or more of coordinate partpositioning, linear partpositioning, planar partpositioning, spatial partpositioning, parametric partpostioning, and/or hybrid partpositioning.

12. The system of claim 2, further comprising one or more part groups, wherein each part group has a set of one or more parts.

13. The system of claim 12, wherein each part group has a node dominance setting.

14. The system of claim 13, wherein the node dominance setting is either vertical dominant or horizontal dominant.

15. The system of claim 14, wherein when parts intersect at a node within the user interface, dominant parts carry through and non-dominant parts end or split at the node.

16. The system of claim 12, further comprising one or more part group classes, each part group class having one or more part groups which are substitutable for each other.

17. The system of claim 16, wherein the user interface enables selection of different options among part group classes, and wherein the user changing a part group class selection automatically alters all parts within a configured product belonging to a prior part group to parts belonging to the newly selected part group within the part group class.

18. The system of claim 17, wherein there is a part group class for trim, and changing between trim part groups changes dimensions and/or connections of parts having trim and also changes the dimensions and/or connections of one or more parts which do not have trim but connect, directly or indirectly, to one or more parts having trim.

19. The system of claim 2, further comprising the processor operating order software to generate, for a user configured product, at least one of: a bill of materials;

purchase orders for third-party manufacturers; shop floor instructions; and/or computer numerically controlled (CNC) machining code.

20. The system of claim 19, wherein the order software further operates to generate at least one of: overall product weight; product price; and/or purchase orders for suppliers.

21. The system of claim 20, wherein the user interface displays the product price of the user configured product.

22. The system of claim 2, wherein the operating software further accesses a set of one or more pre-configured products for selection and/or modification within the user interface.

23. The system of claim 22, wherein the user interface further enables submission and storage of a user configured product within the set of one or more pre-configured products.

24. The system of claim 2, wherein the user interface enables sizing modifications through click-and-drag mouse input operation on one or more nodes within the matrix.

25. The system of claim 24, wherein click-and-drag sizing proportionally increases or decreases the distance nodes.

26. The system of claim 24, wherein click-and-drag sizing increases or decreases one or more cell groups adjacent to the one or more nodes according to the sizing change until the sizing change is reached or a maximum or minimum size of the cell group is reached, and if the maximum or minimum size of the cell group was reached sequentially sizing one or more cell groups adjacent to the maximized or minimized cell group and repeating until the sizing modification is complete.

27. The system of claim 2, wherein the user interface displays an image of the product rendered for a three-dimensional perspective view in real-time while product modifications are made by the user.

28. The system of claim 2, further comprising one or more cell group allocations, each cell group allocation having one or more cell groups associated with one or more part group classes.

* * * * *